US012603678B2

(12) United States Patent
Takizawa et al.

(10) Patent No.: US 12,603,678 B2
(45) Date of Patent: Apr. 14, 2026

(54) RECEPTION-SIDE APPARATUS AND RADIO COMMUNICATION METHOD

(71) Applicant: TOYOTA JIDOSHA KABUSHIKI KAISHA, Toyota (JP)

(72) Inventors: Kenichi Takizawa, Koganei (JP); Masafumi Moriyama, Koganei (JP); Fumihide Kojima, Koganei (JP); Atsushi Kurosawa, Fuchu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/435,399

(22) Filed: Feb. 7, 2024

(65) Prior Publication Data

US 2024/0178886 A1 May 30, 2024

Related U.S. Application Data

(63) Continuation of application No. 18/145,472, filed on Dec. 22, 2022, now Pat. No. 11,929,795, which is a (Continued)

(30) Foreign Application Priority Data

Oct. 15, 2020 (JP) ................................. 2020-174201

(51) Int. Cl.
*H04L 23/02* (2006.01)
*H04B 7/0408* (2017.01)
(Continued)

(52) U.S. Cl.
CPC ......... *H04B 7/0408* (2013.01); *H04B 7/0465* (2013.01); *H04B 7/0491* (2013.01); *H04B 7/0623* (2013.01)

(58) Field of Classification Search
CPC .. H04B 7/0404; H04B 7/0608; H04B 7/0617; H04B 17/309; H04B 1/71055;
(Continued)

(56) References Cited

U.S. PATENT DOCUMENTS

| 10,439,681 B1 | 10/2019 | El et al. |
| 11,569,870 B2 | 1/2023 | Takizawa et al. |

(Continued)

OTHER PUBLICATIONS

Hiroshi Suzuki, "Signal Transmission Characteristics of Diversity Reception with Least-Squares Combining-Relationship between Desired Signal Combining and Interference Cancelling—," Transactions of the Institute of Electronics, Information and Communication Engineers, B-II vol. J75-B-II, No. 8, pp. 524-534, Aug. 1992.
(Continued)

*Primary Examiner* — Khai Tran
(74) *Attorney, Agent, or Firm* — Finnegan, Henderson, Farabow, Garrett and Dunner, LLP

(57) ABSTRACT

A reception-side apparatus includes: M receive antennas; and a processor configured to execute a first process of acquiring a first signal received from a first transmission-side apparatus from among signals simultaneously received from the N transmission-side apparatuses by receive diversity processing, and acquiring first data by demodulating and decoding the first signal. In the case of N>M, the processor acquires, for each of all patterns of a combination of a first signal, second signals from M−1 transmission-side apparatuses which are to be cancelled by receive diversity processing and third signals from N−M transmission-side apparatuses which are not to be cancelled by the receive diversity processing, a power ratio of power of the first signal relative to total power of the second and third signals based on a predetermined weight and a channel estimate of each signal, and selects a combination with the largest power ratio from among all the patterns.

8 Claims, 14 Drawing Sheets

Related U.S. Application Data continuation of application No. 17/498,277, filed on Oct. 11, 2021, now Pat. No. 11,569,870.

(51) Int. Cl.
    *H04B 7/0456*      (2017.01)
    *H04B 7/0491*      (2017.01)
    *H04B 7/06*      (2006.01)

(58) Field of Classification Search
    CPC ..... H04B 7/0408; H04B 17/336; H04L 5/006; H04L 25/0202; H04L 27/38; H04L 5/0023; H04L 25/0256; H04W 72/085; H04W 4/46; H04W 72/1268
    USPC .......................................... 375/262, 260, 267
    See application file for complete search history.

(56) References Cited

U.S. PATENT DOCUMENTS

| | | | |
|---|---|---|---|
| 11,929,795 B2 * | 3/2024 | Takizawa .............. | H04B 7/0408 |
| 2005/0157807 A1 * | 7/2005 | Shim .................... | H04B 7/0669 |
| | | | 375/267 |
| 2009/0245443 A1 | 10/2009 | Takayama et al. | |
| 2010/0245173 A1 * | 9/2010 | Honda .................. | H04B 7/0617 |
| | | | 342/372 |
| 2011/0014926 A1 | 1/2011 | Baligh et al. | |
| 2011/0096818 A1 | 4/2011 | Sanada et al. | |
| 2012/0114025 A1 * | 5/2012 | Gauthier .............. | H04B 7/0811 |
| | | | 375/349 |
| 2013/0044683 A1 * | 2/2013 | Maltsev ............... | H04B 7/0684 |
| | | | 370/328 |
| 2013/0052958 A1 * | 2/2013 | Hasegawa ............ | H04B 7/0854 |
| | | | 455/63.1 |
| 2017/0170998 A1 | 6/2017 | Sundaralingam et al. | |
| 2018/0034532 A1 * | 2/2018 | Wu ......................... | H04L 27/26 |
| 2018/0102818 A1 | 4/2018 | Chae et al. | |
| 2019/0081824 A1 * | 3/2019 | Arvinte .............. | H04L 25/0204 |
| 2020/0036426 A1 | 1/2020 | Kim et al. | |
| 2021/0159946 A1 | 5/2021 | Raghavan et al. | |
| 2021/0377743 A1 * | 12/2021 | Choi ..................... | H04W 48/16 |

OTHER PUBLICATIONS

Takeo Ohgane et al., "Applications of Space Division Multiplexing and Those Performance in a MIMO Channel" The transactions of the Institute of Electronics, Information and Communication Engineers. B vol. J87-B No. 9, pp. 1162-1173, Sep. 2004.

Kenichi Higuchi et al., "Multi Antenna Wireless Transfer Technology III Signal Separation Technology in MIMO Multiplexing Method," NTT DoCoMo Technical Journal vol. 14 No. 1, pp. 66-75, Apr. 2006.

Ryo Hayakawa et al., "An Overloaded MIMO Signal Detection Scheme with Slab Decoding and Lattice Reduction" IEICE Technical Report, RCC2015-16, MICT2015-16, pp. 77-82, May 2015.

Hiroshi Suzuki, "Signal Transmission Characteristics of Diversity Reception with Least-Squares Combining -Relationship between Desired Signal Combining and Interference Cancelling," Electronics and Communications in Japan, Part 1, vol. 76, No. 11, pp. 80-94, 1993.

Takeo Ohgane et al., "Applications of Space Division Multiplexing and Those Performance in a MIMO Channel" IEICE Trans. Commun., vol. E88-B, No. 5, pp. 1843-1851, May 1, 2005.

Ryo Hayakawa et al., "An Overloaded MIMO Signal Detection Scheme with Slab Decoding and Lattice Reduction" Proceedings of APCC2015, 2015.

Notice of Allowance issued in U.S. Appl. No. 17/498,277, dated Sep. 23, 2022.

Non Final Office Action issued in U.S. Appl. No. 18/145,472, dated Jun. 16, 2023.

Notice of Allowance issue in U.S. Appl. No. 18/145,472, dated Nov. 8, 2023.

Bai, Lin et al. "Lattice Reduction aided Detection for Underdetermined MIMO Systems: A Pre-Voting Cancellation Approach," IEEE, 2010, 5 Pages.

* cited by examiner

THE NUMBER OF RECEIVE ANTENNAS: M    *FIG. 8*

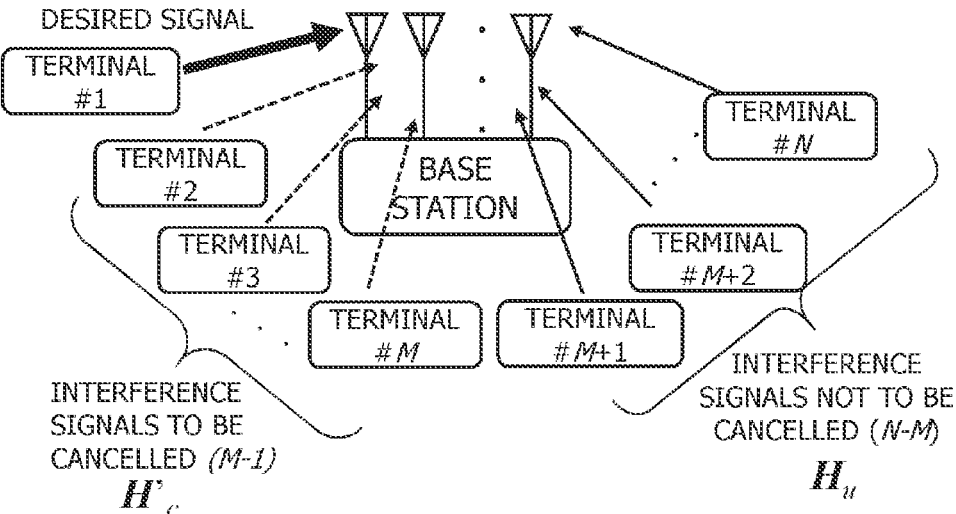

CHANNEL VECTOR OF TERMINAL #j $$hj = (h_{1,j}, h_{2,j}, ..., h_{M,j})^T$$

CHANNEL MATRIX OF INTERFERENCE SIGNALS TO BE CANCELLED (M-1)

$$H_c' = \begin{pmatrix} h_{1,2} & h_{1,3} & \cdots & h_{1,M} \\ h_{2,2} & h_{2,3} & \cdots & h_{2,M} \\ \vdots & \vdots & \ddots & \vdots \\ h_{M,2} & h_{M,3} & \cdots & h_{M,M} \end{pmatrix}$$

CHANNEL MATRIX OF DESIRED SIGNAL + INTERFERENCE SIGNALS TO BE CANCELLED $$H_c = [h_1, H_c']$$

CHANNEL MATRIX OF INTERFERENCE SIGNALS NOT TO BE CANCELLED (N-M)

$$H_u = \begin{pmatrix} h_{1,M+1} & h_{1,M+2} & \cdots & h_{1,N} \\ h_{2,M+1} & h_{2,M+2} & \cdots & h_{2,N} \\ \vdots & \vdots & \ddots & \vdots \\ h_{M,M+1} & h_{M,M+2} & \cdots & h_{M,N} \end{pmatrix}$$

CHANNEL MATRIX OF WHOLE $$H = [H_c, H_u] = \begin{pmatrix} h_{1,1} & h_{1,2} & \cdots & h_{1,N} \\ h_{2,1} & h_{2,2} & \cdots & h_{2,N} \\ \vdots & \vdots & \ddots & \vdots \\ h_{M,1} & h_{M,2} & \cdots & h_{M,N} \end{pmatrix}$$

FIG. 9

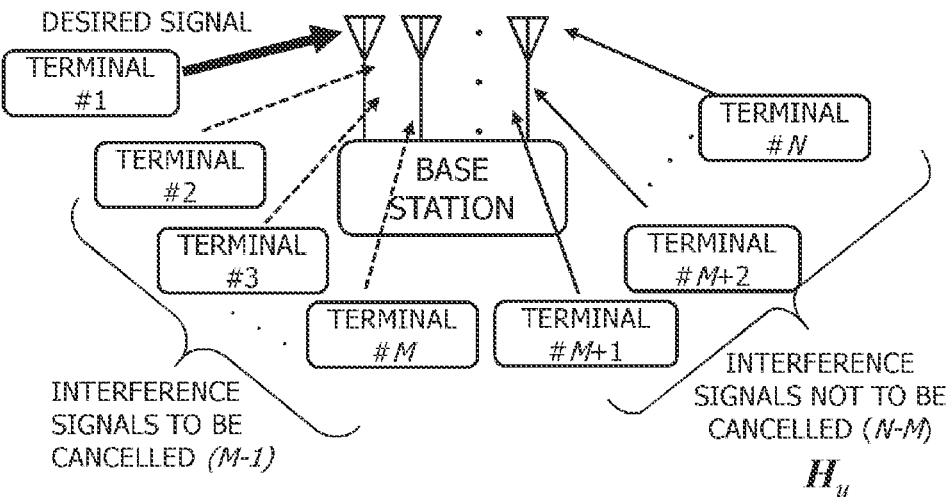

THE NUMBER OF RECEIVE ANTENNAS: M

DESIRED SIGNAL

TERMINAL #1

TERMINAL #2

TERMINAL #3

TERMINAL #M

TERMINAL #M+1

TERMINAL #M+2

TERMINAL #N

BASE STATION

INTERFERENCE SIGNALS TO BE CANCELLED (M-1)

INTERFERENCE SIGNALS NOT TO BE CANCELLED (N-M)

$H_u$

TRANSMISSION AMPLITUDE OF TERMINAL #j $\quad p_j$

CHANNEL MATRIX OF TERMINAL #j $$r_j = p_j h_j = (p_j h_{1,j}, p_j h_{2,j}, \ldots, p_j h_{M,j})^T$$

CHANNEL MATRIX OF DESIRED SIGNAL AND INTERFERENCE SIGNALS TO BE CANCELLED $$R_c = [p_1 h_1, p_2 h_2, \ldots, p_M h_M] = \begin{pmatrix} p_1 h_{1,1} & p_2 h_{1,2} & \cdots & p_M h_{1,M} \\ p_1 h_{2,1} & p_2 h_{2,2} & \cdots & p_M h_{2,M} \\ \vdots & \vdots & \ddots & \vdots \\ p_1 h_{M,1} & p_2 h_{M,2} & \cdots & p_M h_{M,M} \end{pmatrix}$$

CHANNEL MATRIX OF INTERFERENCE SIGNALS NOT TO BE CANCELLED $$R_u = [p_{M+1} h_{M+1}, p_{M+2} h_{M+2}, \ldots, p_N h_N] = \begin{pmatrix} p_{M+1} h_{1,M+1} & p_{M+2} h_{1,M+2} & \cdots & p_N h_{1,N} \\ p_{M+1} h_{2,M+1} & p_{M+2} h_{2,M+2} & \cdots & p_N h_{2,N} \\ \vdots & \vdots & \ddots & \vdots \\ p_{M+1} h_{M,M+1} & p_{M+2} h_{M,M+2} & \cdots & p_N h_{M,N} \end{pmatrix}$$

CHANNEL MATRIX OF WHOLE $\quad R = [R_c, R_u]$

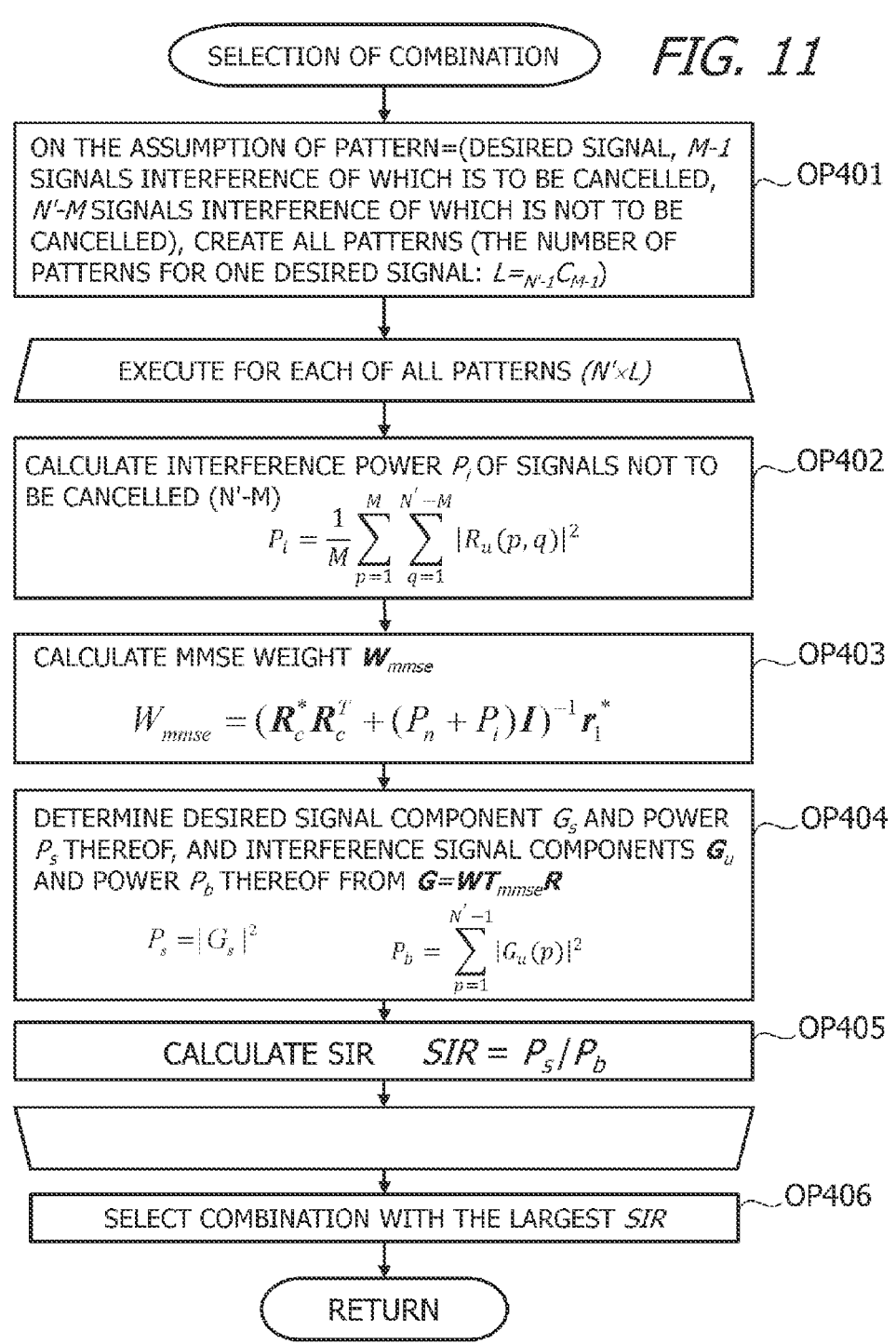

*FIG. 11*

SELECTION OF COMBINATION

ON THE ASSUMPTION OF PATTERN=(DESIRED SIGNAL, *M-1* SIGNALS INTERFERENCE OF WHICH IS TO BE CANCELLED, *N'-M* SIGNALS INTERFERENCE OF WHICH IS NOT TO BE CANCELLED), CREATE ALL PATTERNS (THE NUMBER OF PATTERNS FOR ONE DESIRED SIGNAL: $L=_{N'-1}C_{M-1}$) — OP401

EXECUTE FOR EACH OF ALL PATTERNS *(N'×L)*

CALCULATE INTERFERENCE POWER $P_i$ OF SIGNALS NOT TO BE CANCELLED (N'-M) — OP402

$$P_i = \frac{1}{M} \sum_{p=1}^{M} \sum_{q=1}^{N'-M} |R_u(p,q)|^2$$

CALCULATE MMSE WEIGHT $W_{mmse}$ — OP403

$$W_{mmse} = (R_c^* R_c^T + (P_n + P_i)I)^{-1} r_1^*$$

DETERMINE DESIRED SIGNAL COMPONENT $G_s$ AND POWER $P_s$ THEREOF, AND INTERFERENCE SIGNAL COMPONENTS $G_u$ AND POWER $P_b$ THEREOF FROM $G=WT_{mmse}R$ — OP404

$$P_s = |G_s|^2 \qquad P_b = \sum_{p=1}^{N'-1} |G_u(p)|^2$$

CALCULATE SIR $\quad SIR = P_s/P_b$ — OP405

SELECT COMBINATION WITH THE LARGEST *SIR* — OP406

RETURN

*FIG. 12*

| PARAMETER | VALUE |
|---|---|
| THE NUMBER OF SIMULTANEOUSLY TRANSMITTING TERMINAL | 3 TO 6 (2 RECEIVE ANTENNAS) 5 TO 10 (4 RECEIVE ANTENNAS) |
| THE NUMBER OF RECEIVE ANTENNAS | 2 OR 4 |
| SIZE OF TRANSMIT DATA | 80 bit |
| ERROR CORRECTION CODE (CODING RATE) | TURBO CODE (1/3) |
| MODULATION METHOD | SINGLE CARRIER QPSK |
| TRANSMISSION LINE (MAXIMUM DOPPLER FREQUENCY) | ONE-PASS RAYLEIGH FADING(≒0Hz) |
| SIGNAL-TO-NOISE POWER RATIO (SNR) | 30 dB |

THE NUMBER OF RECEIVE ANTENNAS: 2

BIT ERROR RATE OF FIRST SIC

THE NUMBER OF TERMINALS THAT PERFORM SIMULTANEOUS TRANSMISSION

● IN ORDER OF RECEIVE POWER
▲ CALCULATION OF SIR (METHOD 1; EXCLUDING ONE LOWER SIGNAL)
■ CALCULATION OF SIR (METHOD 2; k=4)

RECEPTION-SIDE APPARATUS AND RADIO COMMUNICATION METHOD

CROSS REFERENCE TO RELATED APPLICATION

This application is a continuation of U.S. patent application Ser. No. 18/145,472, filed Dec. 22, 2022, which is a continuation of U.S. patent application Ser. No. 17/498,277, filed Oct. 11, 2021, which claims the benefit of Japanese Patent Application No. 2020-174201, filed on Oct. 15, 2020, each of which is hereby incorporated by reference herein in its entirety.

BACKGROUND

Technical Field

The present disclosure relates to radio communication.

Description of the Related Art

There is an increasing need to use a terminal connectable to a public network like the Internet for control, and there is a demand for low latency of radio communication accessing a public network. Meanwhile, in radio communication, multiple-input and multiple-output (MIMO) is used. MIMO is a technique in which each of a base station and a terminal performs communication in the same frequency band by a plurality of antennas. In MIMO, a technique in which a plurality of terminals are simultaneously involved in communication is called multi-user MIMO. Accompanying development of such radio communication techniques, future increase in the number of terminals accessing a public network is expected, and a tight situation of an uplink channel is feared.

In radio communication, a communication procedure called configured grant (CG) is defined. As a communication procedure not by CG, dynamic grant is exemplified. In the dynamic grant, a terminal transmits a scheduling request (SR) to a base station at the time of transmitting data to the base station. Then, the base station specifies radio resources that can be used for the data transmission to the terminal by downlink control information (DCI) and permits the transmission. Then, in response to the permission of transmission, the terminal transmits the data to the base station by the specified radio resources.

In comparison, in CG, a base station transmits transmission parameters specifying physical resources and the like that can be used for data transmission to a terminal in advance. Then, the base station notifies the terminal about start and end of permission of data transmission by CG, and the like. However, there may be a case where the transmission parameters for the physical resources and the like and the start of permission are simultaneously transmitted. Thereby, the terminal can immediately transmit data to the base station using the specified physical resources without transmission of an SR and without reception of DCI. Thus, in communication by CG, a terminal can transmit data to a base station, omitting negotiation with the base station. Therefore, CG is expected as a technique that enables low-latency communication.

CITATION LIST

Patent Document

[Non-Patent Document 1]
Hiroshi Suzuki "Signal Transmission Characteristics of Diversity Reception with Least Squares Combining—Relationship between Desired Signal Combining and Interference Cancelling—"; The journal of the Institute of Electronics, Information and Communication Engineers, August 1992, B-II, Vol. J75-B-II, No. 8, pp. 524-534

However, the number (N) of terminals that perform transmission to a base station at the same timing increases due to communication exemplified by CG. A state in which the number (N) of terminals that perform transmission at the same timing is larger than the number (M) of receive antennas of a base station is called overloaded MIMO.

An object of a disclosed embodiment is to reduce deterioration of communication quality in a situation in which overloaded MIMO easily occurs.

SUMMARY

One of the aspects of the present disclosure is a reception-side apparatus including:

M receive antennas; and a processor configured to execute a first process of acquiring a first signal received from a first transmission-side apparatus which is one of N transmission-side apparatuses from among signals simultaneously received from the N transmission-side apparatuses by receive diversity processing, and acquiring first data by demodulating and decoding the first signal, wherein in the first process, the processor is configured to:

acquire all patterns of a combination acquired by classifying the signals from the N transmission-side apparatuses into the first signal from the first transmission-side apparatus, second signals from M−1 transmission-side apparatuses to be cancelled by the receive diversity processing and third signals from N−M transmission-side apparatuses not to be cancelled by the receive diversity processing if the number N of the transmission-side apparatuses is larger than the number M of the receive antennas;

acquire, for each of all the patterns, power of the first signal and power of the second signals based on a weight used for the receive diversity processing for each pattern and acquire power of the third signals from channel estimates;

acquire a power ratio of the power of the first signal relative to total power of the second and third signals; and determine such a combination that the power ratio after the receive diversity processing is the largest, as a combination of signals for which the receive diversity processing is to be executed to perform demodulation.

Another aspect of the present disclosure is a radio communication method executed by a reception-side apparatus provided with M receive antennas, comprising:

executing a first process of acquiring a first signal received from a first transmission-side apparatus which is one of N transmission-side apparatuses from among signals simultaneously received from the N transmission-side apparatuses by receive diversity processing, and acquiring first data by demodulating and decoding the first signal, wherein in the first process, the reception-side apparatus is configured to:

acquire all patterns of a combination acquired by classifying the signals from the N transmission-side apparatuses into the first signal from the first transmission-side apparatus, second signals from M−1 transmission-side apparatuses to be cancelled by the receive diversity processing and third signals from N−M transmission-side apparatuses not to be cancelled by the receive diversity processing if the number N of the transmission-side apparatuses is larger than the number M of the receive antennas;

acquire, for each of all the patterns, power of the first signal and power of the second signals based on a weight used for the receive diversity processing for each pattern, and acquire power of the third signals from channel estimates;

acquire a power ratio of the power of the first signal relative to total power of the second and third signals; and determine such a combination that the power ratio after the receive diversity processing is the largest as a combination of signals for which the receive diversity processing is to be executed to perform demodulation.

According to one of aspects of the present disclosure, it is possible to reduce deterioration of communication quality in a situation in which overloaded MIMO easily occurs.

BRIEF DESCRIPTION OF DRAWINGS

FIG. 4 is a block diagram illustrating a configuration of the base station;

FIG. 7 is a flowchart of a desired signal separation process in the base station;

FIG. 8 is a diagram illustrating the channel matrixes H and R;

FIG. 9 is a diagram illustrating the channel matrixes H and R;

FIG. 11 illustrates an example of a flowchart of the combination selection process in the base station;

FIG. 12 illustrates conditions for the simulations;

DESCRIPTION OF THE EMBODIMENTS

First Embodiment

Figure 1:
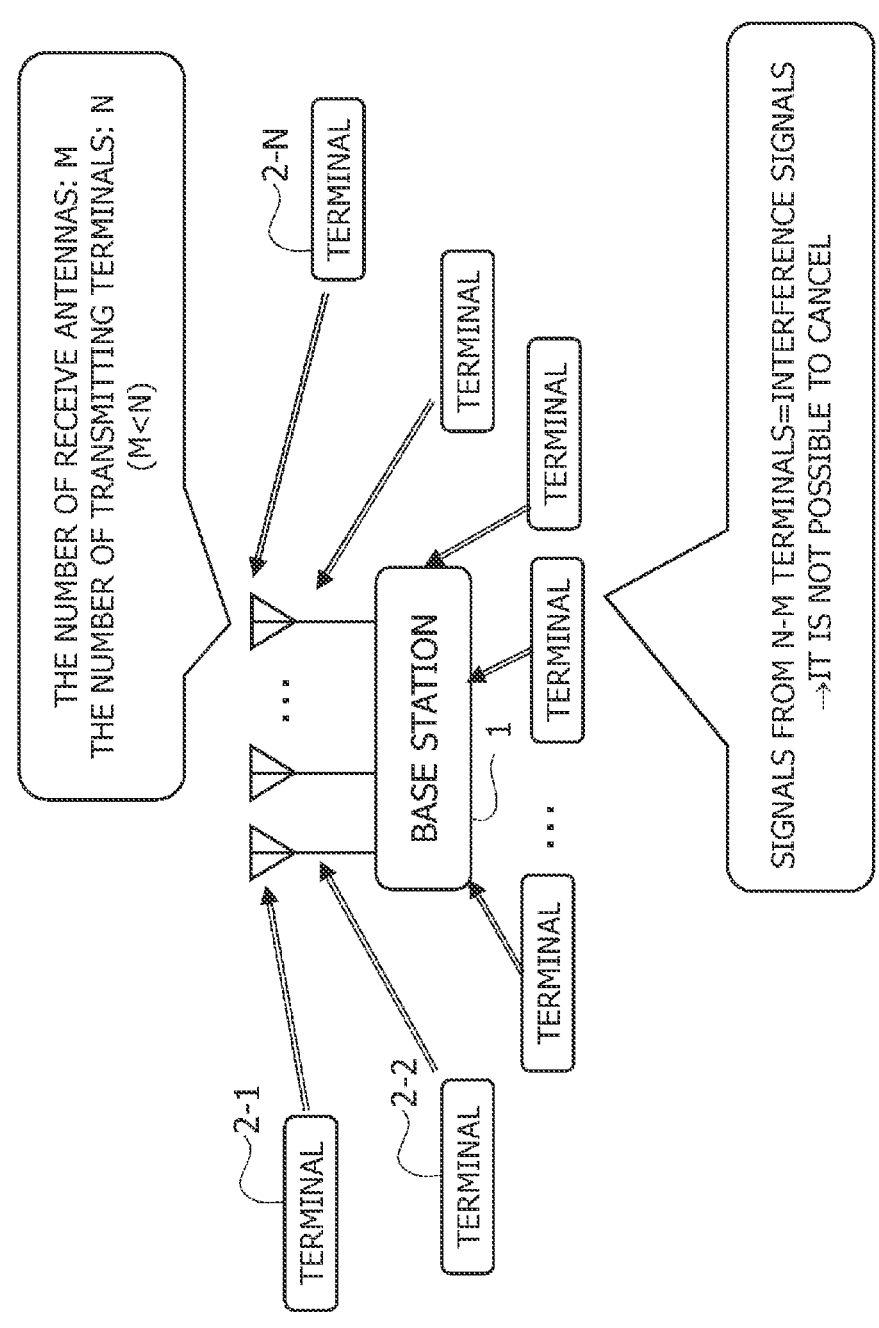
FIG. 1 is a diagram illustrating a configuration of a radio communication system according to a first embodiment.

FIG. 1 is a diagram illustrating a configuration of a radio communication system according to a first embodiment. The present radio communication system includes a base station 1 and a plurality of terminals 2-1, 2-2, . . . , 2-N that communicate with the base station 1 by radio. The terminal 2-1 and the like are also generically referred to as the terminals 2. In the present embodiment, a radio communication system in overloaded MIMO in which the number of terminals N is larger than the number of receive antennas M of a base station in multi-user MIMO is illustrated. The terminals 2 can be said to be radio communication terminals.

In the case of normal MIMO in which the number (N) of transmitting terminals is equal to or smaller than the number (M) of receive antennas of a base station, it is possible to, for example, by using a predetermined receive diversity weight W, take out a desired signal from one terminal and cancel signals from other terminals as interference signals. On the other hand, in the case of overloaded MIMO, since the number (N) of transmitting terminals is larger than the number (M) of receive antennas of a base station, it is not possible to cancel signals from N−M terminals even using the predetermined receive diversity weight W. Since the signals from the N−M terminals that cannot be cancelled remain as interference signals, there is a possibility that an error rate increases due to influence of the interference signals at the time of demodulating a desired signal. Note that canceling the interference signals means eliminating interference with the desired signal by the interference signals.

In the case where the number (N) of transmitting terminals is larger than the number (M) of receive antennas of a base station, signals are classified into a desired signal, interference signals to be cancelled (M−1) and interference signals not to be cancelled (N−M), and receive diversity processing is performed. However, a method for classifying signals from the N transmitting terminals into the desired signal, the interference signals to be cancelled (M−1) and the interference signals not to be cancelled (N−M) is not proposed.

One of the aspects of the present disclosure proposes a method for, when the number (N) of transmitting terminals is larger than the number (M) of receive antennas of a base station, classifying signals into a desired signal, interference signals to be cancelled (M−1) and interference signals not to be cancelled (N−M), the method reducing an error rate of the desired signal more.

More specifically, one of the aspects of the present disclosure is a reception-side apparatus including: M receive antennas; and a processor configured to execute a first process of acquiring a first signal received from a first transmission-side apparatus which is one of N transmission-side apparatuses from among signals simultaneously received from the N transmission-side apparatuses by receive diversity processing, and acquiring first data by demodulating and decoding the first signal. If the number N of transmission-side apparatuses is larger than the number M of receive antennas in the first process, the processor may perform the following process. The processor may acquire all patterns of a combination acquired by classifying the signals from the N transmission-side apparatuses into the first signal from the first transmission-side apparatus, second signals from M−1 transmission-side apparatuses to be cancelled by the receive diversity processing and third signals from N−M transmission-side apparatuses not to be cancelled by the receive diversity processing. For each of all the patterns, the processor may acquire power of the first signal and power of the second signals based on a weight used for the receive diversity processing for each pattern, and acquire power of the third signals from channel estimates. The processor may acquire a power ratio of the power of the first signal relative to total power of the second and third signals;

and determine such a combination that the power ratio after the receive diversity processing is the largest, as a combination of signals for which the receive diversity processing is to be executed to perform demodulation.

The transmission-side apparatuses are, for example, radio communication terminals. The reception-side apparatus is, for example, a base station. However, the transmission-side apparatuses and the reception-side apparatus are not limited to predetermined terminals. For example, the transmission-side apparatuses may be base stations, and the reception-side apparatus may be a radio communication terminal. The receive diversity processing is, for example, a minimum mean square error (MMSE) method. However, a method for the receive diversity processing is not limited thereto. The first signal is a signal to be an extraction target, which is also referred to, for example, as a desired signal. The second and third signals are also referred to as interference signals that influence the desired signal. Therefore, a power ratio of power of the first signal relative to total power of the second and third signals is a so-called signal-to-interference ratio (SIR).

According to one of the aspects of the present disclosure, it is possible to classify signals simultaneously received from a plurality of transmission-side apparatuses into the first signal, the second signals to be cancelled and the third signals not to be cancelled. In the classification, for example, a combination pattern for which an SIR, which is acquired based on a channel estimate of each signal and a weight for the receive diversity processing, is the largest is selected from among all patterns. In other words, it is possible to determine such a combination that influence of the interference signals on the desired signal is the smallest, based on the magnitude of power after the receive diversity processing, and it is possible to reduce an error rate of the desired signal.

In one of the aspects of the present disclosure, if the number N of transmission-side apparatuses is larger than the number M of receive antennas in the first process, the processor may reduce the number of patterns acquired by acquiring receive power of a signal from each of the transmission-side apparatuses; and by acquiring all the patterns of the combination for signals from N' transmission-side apparatuses left after excluding a predetermined number of transmission-side apparatuses from the N transmission-side apparatuses based on the receive power of the signal from each of the transmission-side apparatuses. Since the amount of calculation on the reception-side apparatus is reduced by the number of patterns of the combination of signal classifications being reduced, the processing load on the reception-side apparatus can be reduced.

The signals from the N' transmission-side apparatuses may be identified by excluding the predetermined number of lower transmission-side apparatuses the receive power of which is small from the N transmission-side apparatuses. Alternatively, the signals from the N' transmission-side apparatuses may be identified by excluding such transmission-side apparatuses that a value acquired by multiplying the receive power by a constant k (k>1) is smaller than the largest receive power from the N transmission-side apparatuses.

In one of the aspects of the present disclosure, the receive diversity processing may be minimum mean square error (MMSE) diversity. In this case, for each of all the patterns of signal classification, the processor may determine the weight of MMSE using power of the third signals of each pattern as a part of interference power. By determining the weight of MMSE, using the power of the third signals as a part of the interference power, a weight that reduces more influence of the third signals, which are interference signals not to be cancelled, can be acquired.

In one of the aspects of the present disclosure, the processor may further execute the following second and third processes. In the second process, the processor may generate a signal arriving from the first transmission-side apparatus before the receive diversity processing being performed, based on the first signal or the first data. In the third process, the processor may extract signals left after excluding the signal generated by the second process arriving from the first transmission-side apparatus from the received signals. The processor may further execute sequentially repeating, for the signals extracted by the third process, the first to third processes with one of N−1 transmission-side apparatuses left after excluding the first transmission-side apparatus from the N transmission-side apparatuses newly as a first transmission-side apparatus. Thereby, it is possible to, when simultaneously receiving communication from the N transmission-side apparatuses larger than the number M of receive antennas, reproduce signals from all the transmission-side apparatuses.

Further, in one of the aspects of the present disclosure, the processor may permit communication the reception-side apparatus itself by a plurality of transmission-side apparatuses that are not assigned radio resources when a communication request to the reception-side apparatus occurs, may determine the N transmission-side apparatuses among the plurality of transmission-side apparatuses based on a received reference signal, and repeat the first to third processes when signals are simultaneously received from the N transmission-side apparatuses. An example of the communication with the reception-side apparatus by a plurality of transmission-side apparatuses that are not assigned radio resources when a communication request to the reception-side apparatus occurs is CG in which the upper limit of N is not restricted. When communication by CG without restriction of the upper limit of N is performed, such a situation easily occurs that communication is simultaneously received from N transmission-side apparatuses, N being larger than the number of receive antennas M. However, communication with a stable quality can be maintained.

Figure 2:
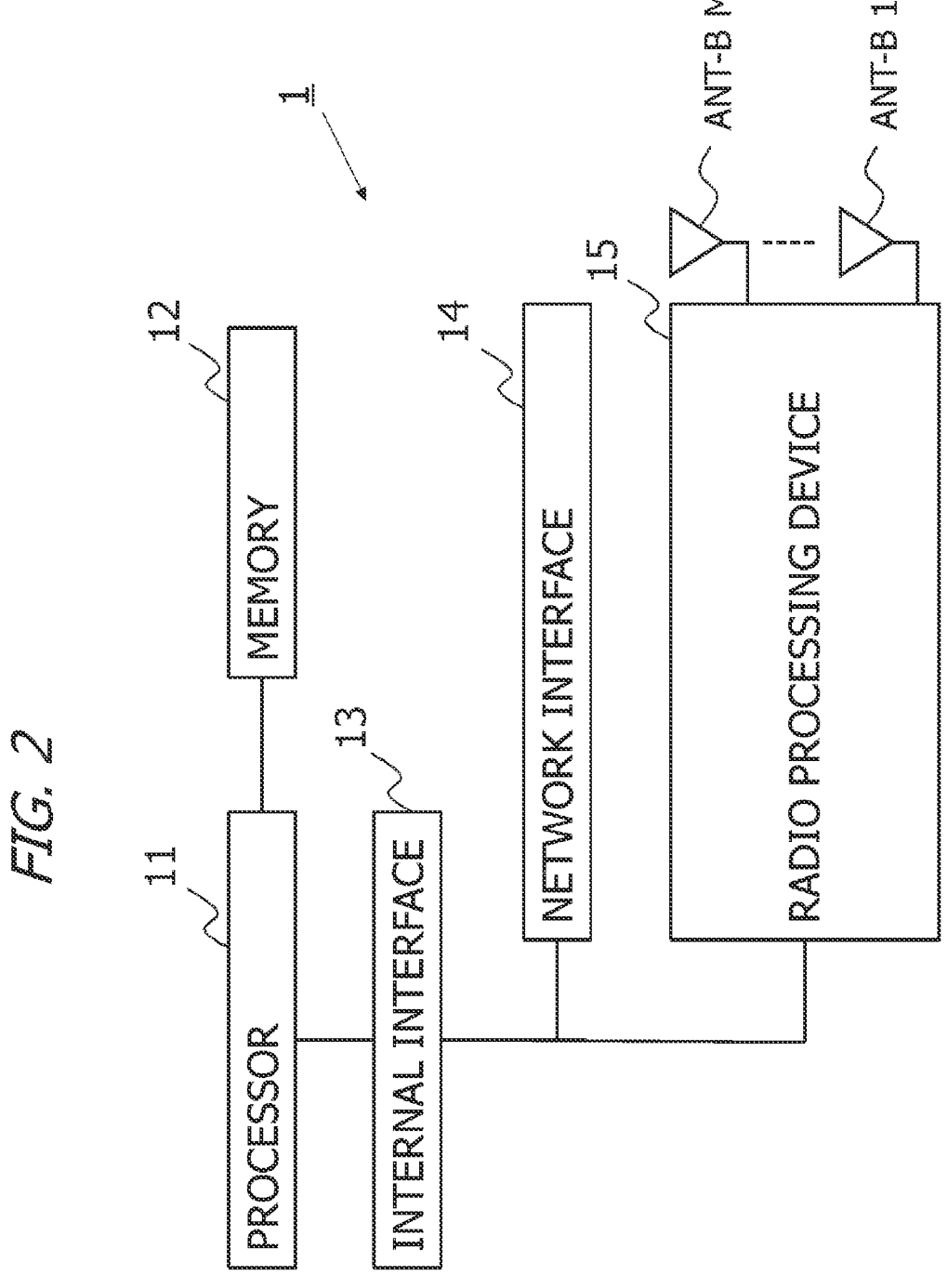
FIG. 2 is a diagram illustrating a hardware configuration of the base station according to the first embodiment.

FIG. 2 is a diagram illustrating a hardware configuration of the base station 1 according to the first embodiment. The base station 1 includes a processor 11, a memory 12, an internal interface 13, a network interface 14 for communicating with other base stations and the like, and a radio processing device 15.

The processor 11 is also referred to as a central processing unit (CPU) or a microprocessor unit (MPU). The processor 11 is not limited to a single processor but may be in a multiprocessor configuration. Further, a single physical CPU connected with a single socket may be in a multi-core configuration. Furthermore, the processor 11 may include arithmetic devices in various circuit configurations such as a digital signal processor (DSP) and a graphics processing unit (GPU). Further, the processor 11 may be such that cooperates with an integrated circuit (IC), other digital circuits or analog circuits. The integrated circuit may be such that includes an LSI, an application-specific integrated circuit (ASIC) and a programmable logic device (PLD). The PLD may be such that includes, for example, a field-programmable gate array (FPGA). Therefore, the processor 11 may be such that is called, for example, a microcontroller (MCU), an SOC (system-on-a-chip), a system LSI, a chip set or the like.

The memory 12 stores a command sequence (a computer program) to be executed by the processor 11 or data to be processed by the processor 11 and the like. The processor 11 and the memory 12 may be called a baseband unit (BBUs). The internal interface 13 is a circuit that connects various kinds of peripheral devices to the processor 11.

The network interface 14 is a communication device for the base station 1 to access a network to which other base stations are connected. The network to which the other base stations are connected is also called a backhaul. The backhaul is, for example, a wired network by optical communication.

The radio processing device 15 includes a transceiver to transmit a radio signal, a receiver to receive a radio signal and the like, and is connected to antennas ANT-B1, . . . , ANT-BM. The radio processing device 15 may have as many transceivers and receivers as antennas, that is, M transceivers and receivers. The radio processing device 15 is called a remote radio head (RRH) and may be connected to the baseband unit via a wired network by optical communication and installed remotely. A configuration is also possible in which a plurality of remote radio heads are connected to one baseband unit. Note that the network connecting the baseband unit and the remote radio heads is also called a front haul.

Figure 3:
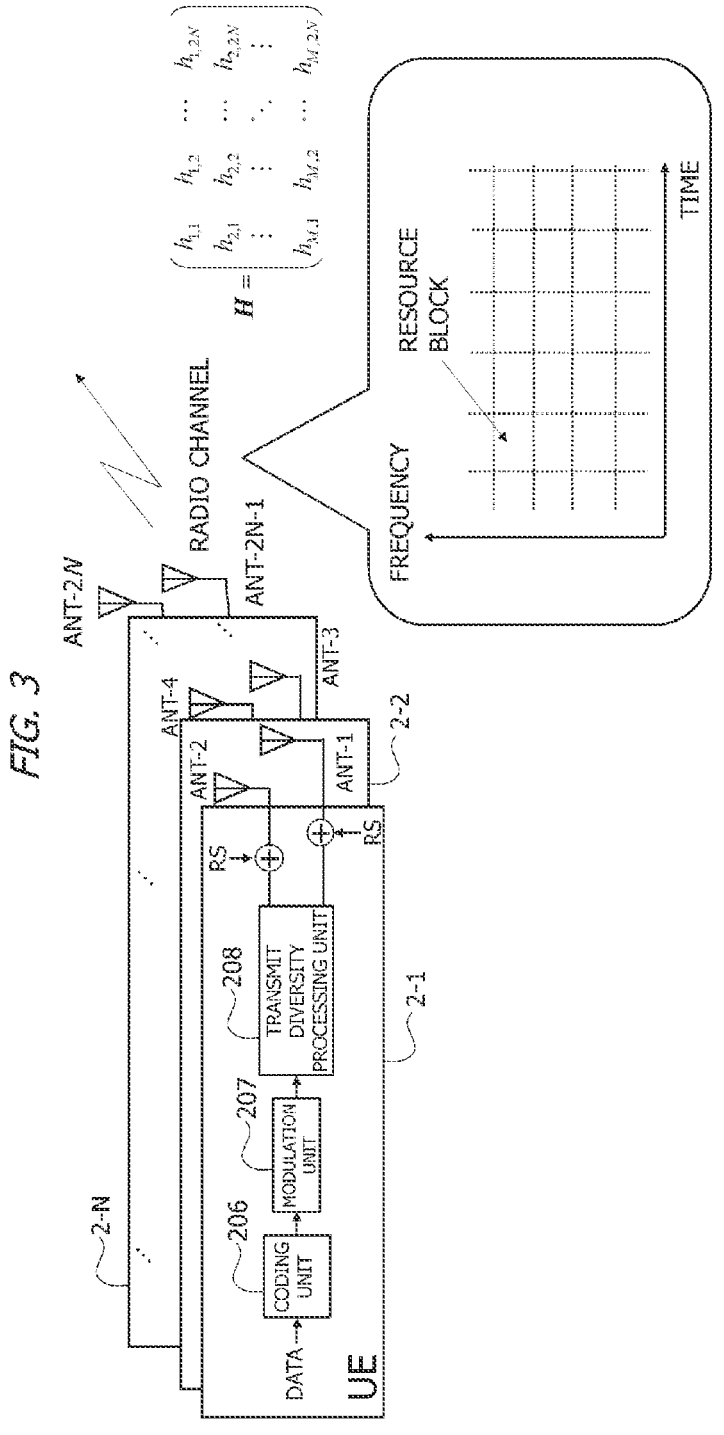
FIG. 3 is a block diagram illustrating a configuration of each terminal.

FIG. 3 is a block diagram illustrating a configuration of each terminal 2. In FIG. 3, radio resource blocks and a channel matrix H of a radio channel are illustrated together with the configuration of each terminal 2. The radio resource blocks are parts divided by frequencies of subcarriers assigned to the terminals 2 and a time axis. The channel matrix H is a matrix indicating fluctuation amounts of amplitudes and phases of transmission lines between the antennas ANT-1 and ANT-2, and the like of the terminals 2 and the receive antennas ANT-B1 to ANT-BM of the base station 1. By multiplying a transmit signal vector of each of the antennas ANT-1 and ANT-2, and the like of the transmission-side terminals 2 by the channel matrix H, an estimate of a received signal vector at each of the receive antennas ANT-B1 to ANT-BM of the base station 1 can be acquired.

In FIG. 3, the plurality of terminals 2-1, . . . , 2-N are illustrated. A detailed configuration of each terminal 2 is exemplified by that of the terminal 2-1. In FIG. 3, the terminals 2 have pairs of antennas ANT-1 and ANT-2, . . . , ANT-2N−1 and ANT-2N. In the description below, the antennas of each terminal 2 are generically written simply as antennas ANT. In the present embodiment, however, the number of antennas of each terminal 2 is not limited to two.

Each terminal 2 is also called a user equipment (UE). The terminal 2 has a processor, a memory, a radio processing device, the antennas ANT and the like. The processor, memory and radio processing device of the terminal 2 are similar to the processor 11, the memory 12 and the radio processing device 15 described with reference to FIG. 2. However, in the terminal 2, the processor, the memory and the radio processing device are usually accommodated in one case. The processor of the terminal 2 executes a radio communication process including processes of a coding unit 206, a modulation unit 207 and a transmit diversity processing unit 208.

The coding unit 206 performs error-correction coding of data transmitted from the terminal 2. An error-correction code may be either a soft-decision code or a hard-decision code, and the type of coding is not restricted. The modulation unit 207 digitally modulates error-correction coded data. A method for the digital modulation is, for example, quadrature amplitude modulation (QAM), phase shift keying (PSK), frequency shift keying (FSK) or the like.

The transmit diversity processing unit 208 separates a digitally modulated signal into a plurality of parts to form transmit diversity branches. The transmit diversity processing unit 208 emits the signal separated in the plurality of branches from the plurality of antennas ANT through the radio processing device. In the example of FIG. 3, the transmit diversity processing unit 208 of each terminal 2 separates a transmission line by the two antennas to form transmit diversity branches. In the present embodiment, however, the processing by the transmit diversity processing unit 208 is not limited to diversity by a plurality of antennas. For example, if each terminal 2 has a single antenna, the transmit diversity processing unit 208 may adopt polarization diversity, time diversity, frequency diversity or the like. In the present embodiment, the diversity processing is not limited, and various kinds of diversities are adopted.

Figure 4:
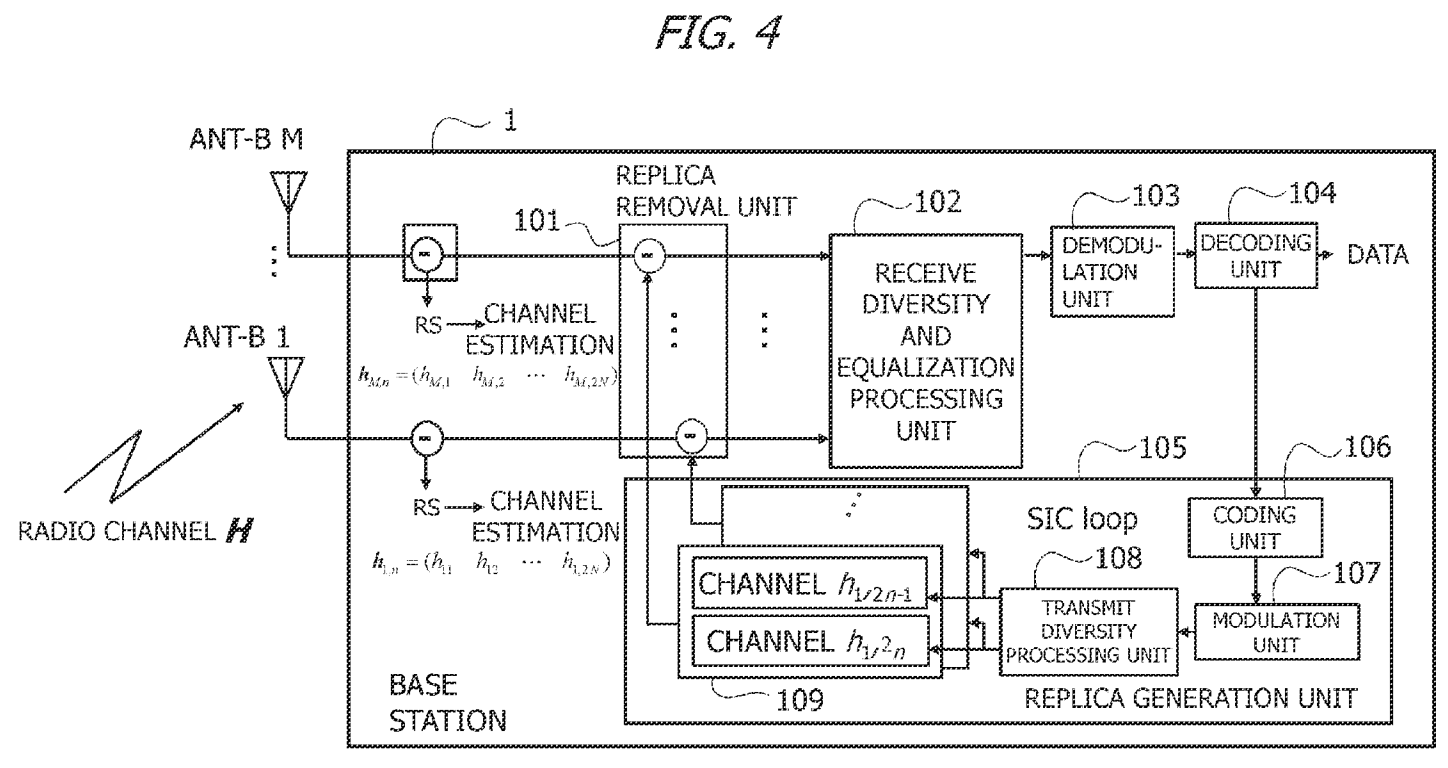

FIG. 4 is a block diagram illustrating a configuration of the base station 1. The base station 1 has a replica removal unit 101, a receive diversity and equalization processing unit 102, a demodulation unit 103, a decoding unit 104 and a replica generation unit 105. The replica generation unit 105 has a coding unit 106, a modulation unit 107, a transmit diversity processing unit 108 and a channel matrix multiplication unit 109. By the processor 11 illustrated in FIG. 2 executing the command sequence (the computer program) executably developed on the memory 12, each of processes of the replica removal unit 101, the receive diversity and equalization processing unit 102, the demodulation unit 103, the decoding unit 104, the replica generation unit 105, the coding unit 106, the modulation unit 107, the transmit diversity processing unit 108 and the channel matrix multiplication unit 109 is executed.

In FIG. 4, the channel matrix H is illustrated together with the components of the base station 1. A configuration of the channel matrix H is the same as that of FIG. 3. The channel matrix H is a matrix indicating fluctuation amounts of amplitudes and phases of transmission lines between the antennas ANT-1 and ANT-2, and the like of the terminals 2 and the antennas ANT-B1 to ANT-BM of the base station 1. The channel matrix H is determined by receiving reference signals (RSs) transmitted from antennas 2j-1 and 2j (j=1, . . . , N) of terminals 2-j by the antennas ANT-B1, . . . , ANT-BM. The same goes for a case where the number of antennas of each terminal 2 is different from two. In short, the fluctuation amounts corresponding to transmission functions of the transmission lines are determined by the reference signals transmitted and received between the antennas 2j−1 and 2j on the transmission side and the antennas ANT-Bi on the reception side.

In the communication system of the present embodiment, the RSs are transmitted by the same resource blocks as used by CG. However, the RSs may be transmitted by resource blocks different from the resource blocks used by CG. In the present embodiment, since the RSs are transmitted by the same resource blocks as used in CG, RSs from the transmit antennas ANT of each terminal 2 are orthogonal to each other so that RSs do not interfere with one another among the plurality of terminals 2. Examples of how to cause the RSs to be orthogonal to each other can include a method of preventing the RSs from temporally overlapping with each other (TDMA), a method of shifting frequencies (FDMA), orthogonality by codes (CDMA) and the like. In the present embodiment, for example, CDMA is adopted. As codes used for RSs, the base station 1 assigns mutually different codes to the terminals 2 at the time of setting CG. An RS is added before and after data (DS: data signal) transmitted from each terminal 2. Since the RSs are orthogonal to each other, the base station 1 can separate each RS and measure the channel matrix H even in the state of overloaded MIMO. In the present embodiment, the description is made on the assumption that the base station 1 has always measured the latest channel matrix H.

In the present embodiment, radio signals in overlapping resource blocks simultaneously transmitted from N terminals 2 more than the number of receive antennas M are received by the receive antennas ANT-B1 to ANT-BM (overloaded MIMO). On each of the antennas ANT-B1 to ANT-BM, signals from the plurality of terminals 2 interfere with one another. Furthermore, in the state of the overloaded MIMO, the effect of transmit diversity effect does not occur. Therefore, in the base station 1 of the present embodiment, the processor 11 repeatedly executes serial canceller (successive interference canceller; SIC) for sequentially performing MMSE equalization and removal of interference replicas of transmit signals.

First, SIC will be described. In SIC, first, the processor 11 determines received signals sx1 and sx2 (an integer satisfying 1≤x≤N) from transmit branches 2x−1 and 2x of a terminal 2-x to be noticed (antennas ANT-2x−1 and ANT-2x of the terminal 2-x) by MMSE equalization among signals received from the terminals 2. How the terminal 2-x to be noticed is to be selected is determined by a process described later.

Next, the processor 11 generates interference replicas rx1(i) and rx2(i) (i=1, . . . , M) from the transmit branches 2x−1 and 2x (the transmit antennas ANT-2x−1 and ANT-2x) corresponding to the received signal sx1 and sx2. The interference replicas rx1(i) and rx2(i) are estimates of received signals from the transmit branches 2x−1 and 2x (the transmit antennas ANT-2x−1 and ANT-2x) before being MMSE equalized, which are received by the receive antennas ANT-Bi.

Then, the processor 11 removes the interference replicas rx1(i) and rx2(i) (i=1, . . . , M) from received signals at the receive antennas ANT-B1 to ANT-BM. Thereby, the processor 11 can acquire received signals that are not influenced by transmit signals from the transmit branches 1 and 2 (the transmit antennas ANT-2x−1 and ANT-2x) as if the received signal had been received from the receive antennas ANT-B1 to ANT-BM. A terminal 2-X to be noticed is newly determined from among terminals 2 that have not been removed (that remain) successively, and the SIC process is repeatedly executed for the transmit branches 2x−1 and 2x of the terminal 2-x (the transmit antennas ANT-2x−1 and ANT-2x of the terminal 2-x). In other words, when a terminal to be noticed in the j-th SIC loop (j=1, . . . , N) is assumed to be a terminal 2-x(j), a similar process is repeated for received signals left after excluding transmit signals from terminals 2-x(1) to 2-x(j−1). By such control of the processor 11, received signals from the antennas ANT-1 and ANT-2, . . . , ANT-2N−1 and ANT-2N of the individual terminals 2 are successively determined for radio signals received in overloaded MIMO. A description has been made on SIC so far.

Next, components of the base station 1 will be described. The replica removal unit 101 subtracts interference replicas generated by the replica generation unit 105 described later from each of received signals s(i) (i=1, . . . , M) received by the receive antennas ANT-B1 to ANT-BM. After execution of the first SIC loop, that is, when the second SIC loop starts, signals s2(i) acquired by subtracting interference replicas r1-xj(i), r2-xj(i) (i=1, . . . , M) from the received signals s(i)

(i=1, . . . , M), respectively, are outputted from the replica removal unit 101. Received signals sj(i) (i=1, . . . , M; j=1, . . . , N) outputted from the replica removal unit 101 when the j-th SIC loop (j=1, . . . , N) starts are signals acquired by subtracting interference replicas r1-x1(1) and r2-x1(1) to r1-x(j−1) (i) and r2-x(j−1) (i) (i=1, . . . , M) of the terminals 2-x(1) to 2-x(j−1) from received signals s(i)=s1(i). Note that the interference replicas r1-x(j−1) (i) and r2-x(j−1) (i) are estimates of received signals from the transmit antennas ANT-2x(j−1)−1 and ANT-2x(j−1) of the terminal 2-x(j−1).

The receive diversity and equalization processing unit 102 receives input of the signals sj(i) left after the interference replicas have been removed from the received signals s1(i) received by the receive antennas ANT-B1 to ANT-BM, which are outputted from the replica removal unit 101. In other words, in the j-th SIC loop, the signals sj(i) can be said to be signals including received signals from terminals 2 other than transmit antennas ANT-2x(1)−1 and ANT-2x(1) to ANT-2x(j−1)−1 and ANT-2x(j−1) of the terminals 2-x(1) to 2-x(j−1).

The receive diversity and equalization processing unit 102 determines a combination of a desired signal, interference signals to be cancelled and interference signals not to be cancelled for the signals included in the signals sj(i). The desired signal is a received signal from the terminal 2-x(j) to be noticed. Specifically, the receive diversity and equalization processing unit 102 acquires all patterns of the combination of a desired signal, interference signals to be cancelled and interference signals not to be cancelled for the signals included in the signals sj(i). Next, for each of all the patterns, the receive diversity and equalization processing unit 102 acquires a signal-to-interference ratio (SIR) of the signals after processing by the receive diversity and equalization processing unit 102 by an MMSE method. The receive diversity and equalization processing unit 102 selects a combination with the largest SIR and determines a terminal 2-x(j) to be noticed.

The receive diversity and equalization processing unit 102 eliminates interferences of terminals 2 other than each terminal 2-x(j) to be noticed (transmit antennas ANT-2x(j)−1 and ANT-2x(j)) by the MMSE method. Therefore, the receive diversity reception and equalization processing unit 102 calculates an MMSE weight Wmmse vector from the channel matrix H and an Hermitian transpose matrix H^T thereof by Formula (1) below:

$$Wmmse = \left(R^* R^T + (P_n + P_i)I\right)^{-1} r_1^* \qquad \text{(Formula 1)}$$

A matrix R in (Formula 1) is a matrix acquired by multiplying the channel matrix H by a transmission amplitude of each terminal 2. Hereinafter, the matrix R is also referred to a channel matrix. Pn indicates noise power per receive antenna. Pn indicates a default value measured in advance. Pi indicates power of interference signals not to be cancelled. A matrix I is a unit matrix. A vector r is a channel vector multiplied by a transmission amplitude of a desired signal.

Then, the receive diversity and equalization processing unit 102 multiplies the MMSE weight Wmmse vector by each of the received signals sj(i) (i=1, . . . , M; j=1, . . . , N) received by the receive antennas ANT-B1 to ANT-BM. Thereby, for signals from the transmit antennas ANT-2j−1 and ANT-2j of the terminals 2-j, the receive diversity and equalization processing unit 102 executes an equalization process in which interference from other transmit antennas is eliminated. The receive diversity and equalization processing unit 102 acquires all patterns of the combination of a desired signal, interference signals to be cancelled and interference signals not to be cancelled, for signals of terminals 2 other than the terminals 2-x(1) to 2-x(j−1) that have been already removed in the first to the (j−1)th loops, in the j-th loop of each SIC. Next, for each of all the patterns, the receive diversity and equalization processing unit 102 acquires an SIR from a calculation result of multiplying the channel matrix R by the MMSE weight Wmmse. Then, the receive diversity and equalization processing unit 102 determines a terminal 2 corresponding to a desired signal in a combination with the largest SIR as a terminal 2-x(j) to be noticed in the j-th loop. Then, the receive diversity and equalization processing unit 102 executes a reception process by transmit diversity using a plurality of branches from the determined one terminal 2-x(j).

The demodulation unit 103 generates a bit string from the received signal acquired by the receive diversity and equalization processing unit 102. The decoding unit 104 decodes an error correction code from the bit string acquired by the demodulation unit 103 to acquire data.

The replica generation unit 105 generates interference replicas transmitted from the antennas ANT-2j−1 and ANT-2j of the terminal 2 and received by the receive antennas ANT-B1 to ANT-BM, based on the signal from the terminal 2 that has been decoded.

In other words, the coding unit 106 performs error correction coding of the data that has been transmitted from the terminal 2 and decoded, again. The modulation unit 107 digitally modulates the error-correction coded data. The transmit diversity processing unit 108 executes the same transmit diversity processing as the terminal 2. The channel matrix multiplication unit 109 multiplies a channel matrix by a transmit signal that is transmit-diversity processed and transmitted from each transmit branch of the terminal 2. By this multiplication, interference replicas to be received by the receive antennas ANT-B1 to ANT-BM are generated. The data decoded by the decoding unit 104 can be said to be first data decoded from a first signal.

Figure 5:
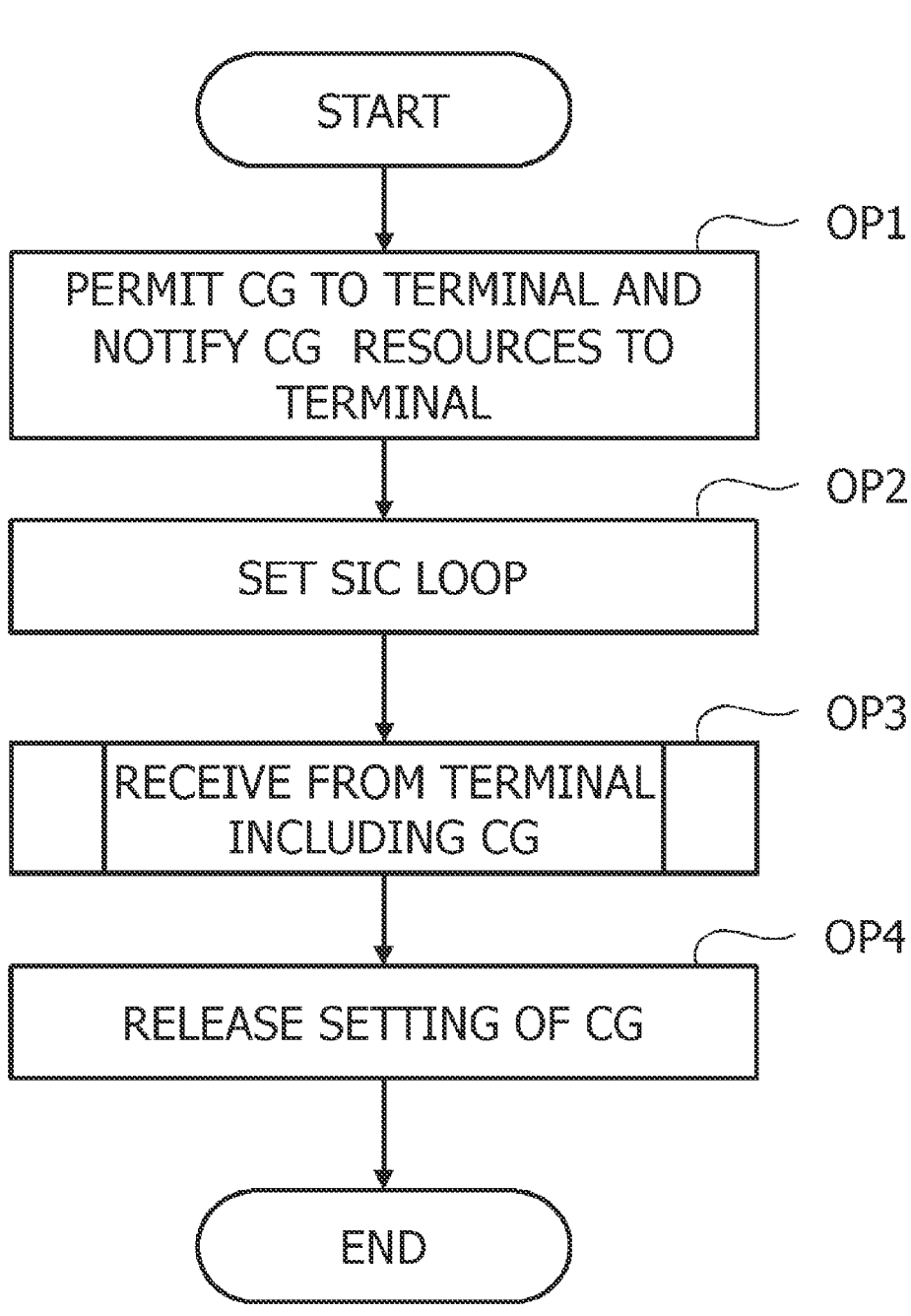
FIG. 5 is a flowchart illustrating a process of the base station.

FIG. 5 is a flowchart illustrating a process of the base station 1. At OP1, at the time of connecting to a terminal 2, the processor 11 permits CG to the terminal 2 and specifies resources used in CG and an RS (reference signal) that is different for each terminal. Here, as "the time of connecting", time when a connection is established between terminal 2 and the base station by a procedure called signaling or time of initial setting between the terminal 2 and the base station are exemplified.

At OP2, the processor 11 makes settings for performing reception by the SIC loop in the base station 1. In the SIC loop, for example, the processor 11 stores relationships between RSs specified to the terminals 2 and identification information pieces about the terminals 2 into the memory 12 so as to confirm RSs received from the terminals to identify the terminals 2. Further, the processor 11 determines the number of times of the SIC loop based on the number of terminals from which RSs have been received and stores the number of times into the memory 12. The number of times of the SIC loop is, for example, the number N of terminals 2 from which the RSs have been received minus one.

At OP3, the processor 11 receives a signal from each of the terminals 2 by CG. Note that, in response to reception of the signal from the terminal 2, the processor 11 appropriately returns a response (ACK or NACK) from the base station 1. At OP4, at the time of the base station 1 releasing the connection with the terminal 2, the processor 11 releases the setting of CG and ends the process illustrated in FIG. 5. The time of releasing the connection refers to the time of the terminal 2 leaving the cell of the base station 1, the time of the terminal 2 stopping processing or the like. According to the above process, when the base station 1 permits CG to the terminals 2, the processor 11 makes the settings for performing reception by the SIC loop in the base station 1.

Figure 6:
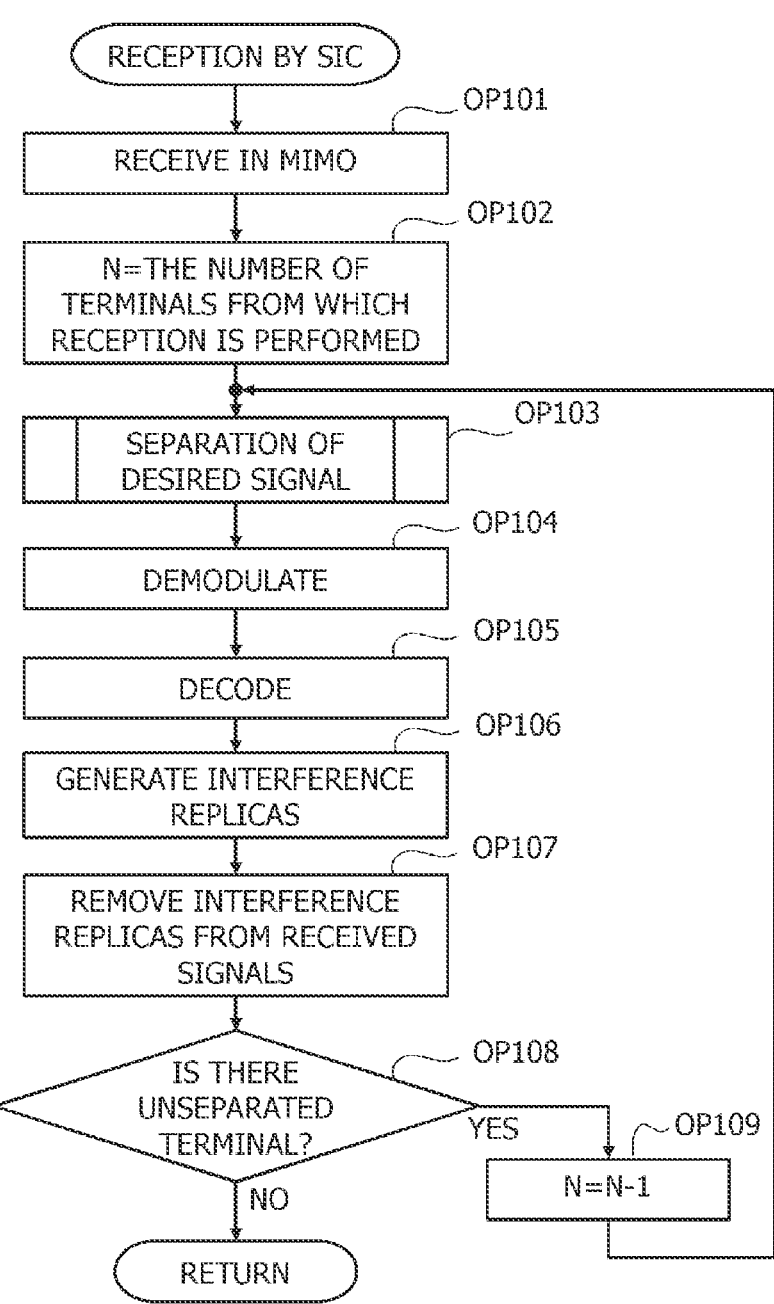
FIG. 6 is a flowchart of a reception process in the base station between the base station and the terminals by CG.

FIG. 6 is a flowchart of a reception process in the base station 1 between the base station 1 and the terminals 2 by CG. The process illustrated in FIG. 6 corresponds to the process of OP3 of FIG. 5. The process of FIG. 6 is repeatedly executed until the base station 1 releases connection with the terminals 2. At OP101, the processor 11 acquires received signals in overloaded MIMO, which have been received by the receive antennas ANT-B1 to ANT-BM and the radio processing device 15.

At OP102, the processor 11 sets the initial value of a variable N to the number of terminals of the received signals. The variable N is a variable indicating the number of unseparated terminals. At OP103, the processor 11 determines a terminal 2-X to be noticed, and separates and acquires a signal transmitted from the terminal 2-x (a desired signal) from the received signals by the MMSE method. Since the terminal 2-x transmits a signal by transmit diversity, the processor 11 acquires a modulated carrier signal transmitted from the terminal 2-x based on a plurality of transmit branches. The processor 11 executes the process of OP103 as the receive diversity and equalization processing unit 102.

At OP104, the processor 11 executes a digital demodulation process based on the signal acquired by the process of OP103. In other words, a bit string is taken out from a modulated carrier signal, as a baseband signal. The processor 11 executes the process of OP104 as the demodulation unit 103. At OP105, the processor 11 decodes data from an error-correction coded signal, which is the baseband signal decoded by the process of OP104. The processor 11 executes the process of OP105 as the decoding unit 104. By the process from OP103 to OP105, the signal from the terminal 2 is separated from the received signals, coded and modulated, and the data carried by the modulated carrier is demodulated and decoded. Therefore, the process from OP103 to OP105 can be said to be the first process.

At OP106, the processor 11 generates interference replicas from the transmit branches (transmit antennas) of the terminal 2-x. The processor 11 executes the process of OP106 as the replica generation unit 105. The process of OP106 can be said to be the second process.

At OP107, the processor 11 removes interference replicas from the received signals received by the receive antennas ANT-B1 to ANT-BM and the radio processing device 15. The process of OP107 can be said to be the third process. At OP108, the processor 11 determines whether an unseparated terminal 2 remains or not. If an unseparated terminal 2 remains (OP108: YES), the process proceeds to OP109. If the process has been performed for all the terminals 2, and no unseparated terminal 2 remains (OP108: NO), the process illustrated in FIG. 6 ends, and the process proceeds to OP4 of FIG. 5.

At OP109, the processor 11 subtracts 1 from the variable N and updates the variable N. After that, the process proceeds to OP103; the next terminal 2-x to be noticed is determined; and the process from OP103 to OP108 is performed for the terminal 2-x.

Figure 7:
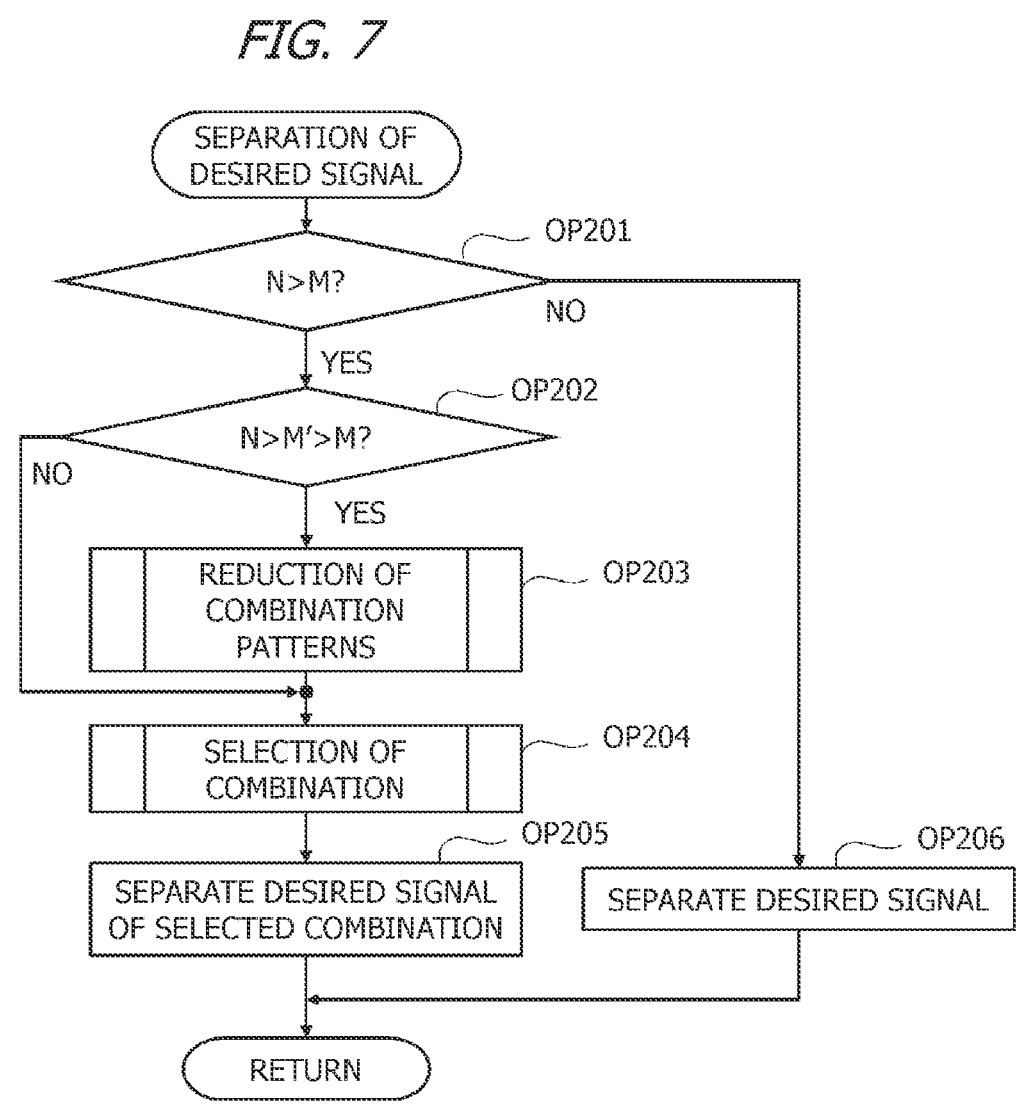

FIG. 7 is a flowchart of a desired signal separation process in the base station 1. The process illustrated in FIG. 7 is the process executed at OP103 of FIG. 6. At OP201, the processor 11 determines whether the variable N is larger than the number of receive antennas M or not. The variable N indicates the number of unseparated terminals. If the variable N is larger than the number of receive antennas M (OP201: YES), it is indicated that an overloaded MIMO state has occurred, and the process proceeds to OP202. If the variable N is equal to or smaller than the number of receive antennas M (OP201: NO), it is indicated that the loaded MIMO state has not occurred, and the process proceeds to OP206. At OP206, the processor 11 determines, for example, such a terminal 2 that a received signal has the largest power among the unseparated terminals 2, as a terminal 2-$x$ to be noticed, and separates and acquires a signal transmitted from the terminal 2-$x$ (a desired signal) from the received signals by the MMSE method. Note that the MMSE weight Wmmse used at OP206 is such that is acquired by setting Pi=0 in (Formula 1). After that, the process illustrated in FIG. 7 ends, and the process proceeds to OP104 of FIG. 6.

At OP202, the processor 11 determines whether the variable N is larger than M' or not. M' is a fixed value larger than the number of receive antennas M. If the variable N is larger than M' (OP202: YES), there are many patterns of the combination of a desired signal, interference signals to be cancelled and interference signals not to be cancelled. Therefore, the process proceeds to OP203, and a combination pattern reduction process is performed at OP203. Details of the process of OP203 will be described later. If the variable N is equal to or smaller than M' (OP202: NO), it is not needed to reduce the patterns of the combination of a desired signal, interference signals to be cancelled and interference signals not to be cancelled, and the process proceeds to OP204.

At OP204, the processor 11 performs a combination decision process. In other words, at OP204, the processor 11 calculates an SIR for each of all the patterns of the combination of a desired signal, interference signals to be cancelled and interference signals not to be cancelled, for the received signals from the unseparated terminals 2, and determines a combination with the largest SIR. Details of the process of OP204 will be described later.

At OP205, the processor 11 calculates an MMSE weight Wmmse for the combination determined at OP204, and acquires a desired signal from calculation results of multiplying each of received signals sj(i) (i=1, . . . , M; j=1, . . . , N) received by the receive antennas ANT-B1 to ANT-BM by the MMSE weight Wmmse vector. After that, the process illustrated in FIG. 7 ends, and the process proceeds to OP104 of FIG. 6.

FIGS. 8 and 9 are diagrams illustrating the channel matrixes H and R. FIGS. 8 and 9 illustrate definitions of matrixes used in processes by flowcharts of FIGS. 10 and 11 described later. FIGS. 8 and 9 illustrate channel matrixes in the case of overloaded MIMO in which the number of receive antennas is M, the number of terminals from which signals are simultaneously received is N, and M<N is satisfied. Further, in FIGS. 8 and 9, a description will be made on the assumption that a signal from a terminal #1 is a desired signal, signals from M−1 terminals #2 to #M are interference signals to be cancelled, and signals from N−M terminals #M+1 to #N are interference signals not to be cancelled.

In FIG. 8, the channel matrix H is illustrated. A vector hj is a channel vector of a signal from a terminal #j. The size of the vector hj is M×1. A matrix Hc' is a channel matrix of the interference signals to be cancelled. The size of the matrix Hc' is M×(M−1). The matrix Hc is a channel matrix of the desired signal and the interference signals to be cancelled. The first column indicates a channel vector h1 of the desired signal, and the second to the (M−1)th columns indicate the channel matrix Hc' of the interference signals to be cancelled. The size of the matrix Hc is M×M. A matrix Hu is a channel matrix of the interference signals not to be cancelled. The size of the matrix Hu is M×(N−M). Note that a whole channel matrix H is an M×N matrix in which the channel matrix Hc of the desired signal and the interference signals to be cancelled and the channel matrix Hu of the interference signals not to be cancelled are arranged.

FIG. 9 illustrates the channel matrix R. The channel matrix R is a matrix determined by multiplying the channel matrix H by transmission amplitudes of the terminals 2. It is assumed that a transmission amplitude of the signal from the terminal #j is indicated by pj. By squaring the transmission amplitude pj, transmit power is acquired.

A vector rj is a channel vector of the terminal #j. Components of the channel vector rj of the terminal #j are acquired by multiplying components of the channel vector hj of the terminal #j by the transmission amplitude pj of the terminal #j.

A matrix Rc is a channel matrix of the desired signal and the interference signals to be cancelled. The matrix Rc is a matrix in which channel vectors h1 to hM of the terminals #1 to #M are arranged. A matrix Ru is a channel matrix of the interference signals not to be cancelled. The matrix Ru is a matrix in which channel vectors hM+1 to hN of the terminals #M+1 to #N are arranged. Note that a whole channel matrix R is an M×N matrix in which the channel matrix Rc of the desired signal and the interference signals to be cancelled and the channel matrix Ru of the interference signals not to be cancelled are arranged. Sizes of the vector rj, the matrix Rc and the matrix Ru are the same as sizes of the vector hj, the matrix Hc and the matrix Hu, respectively.

Figure 10:
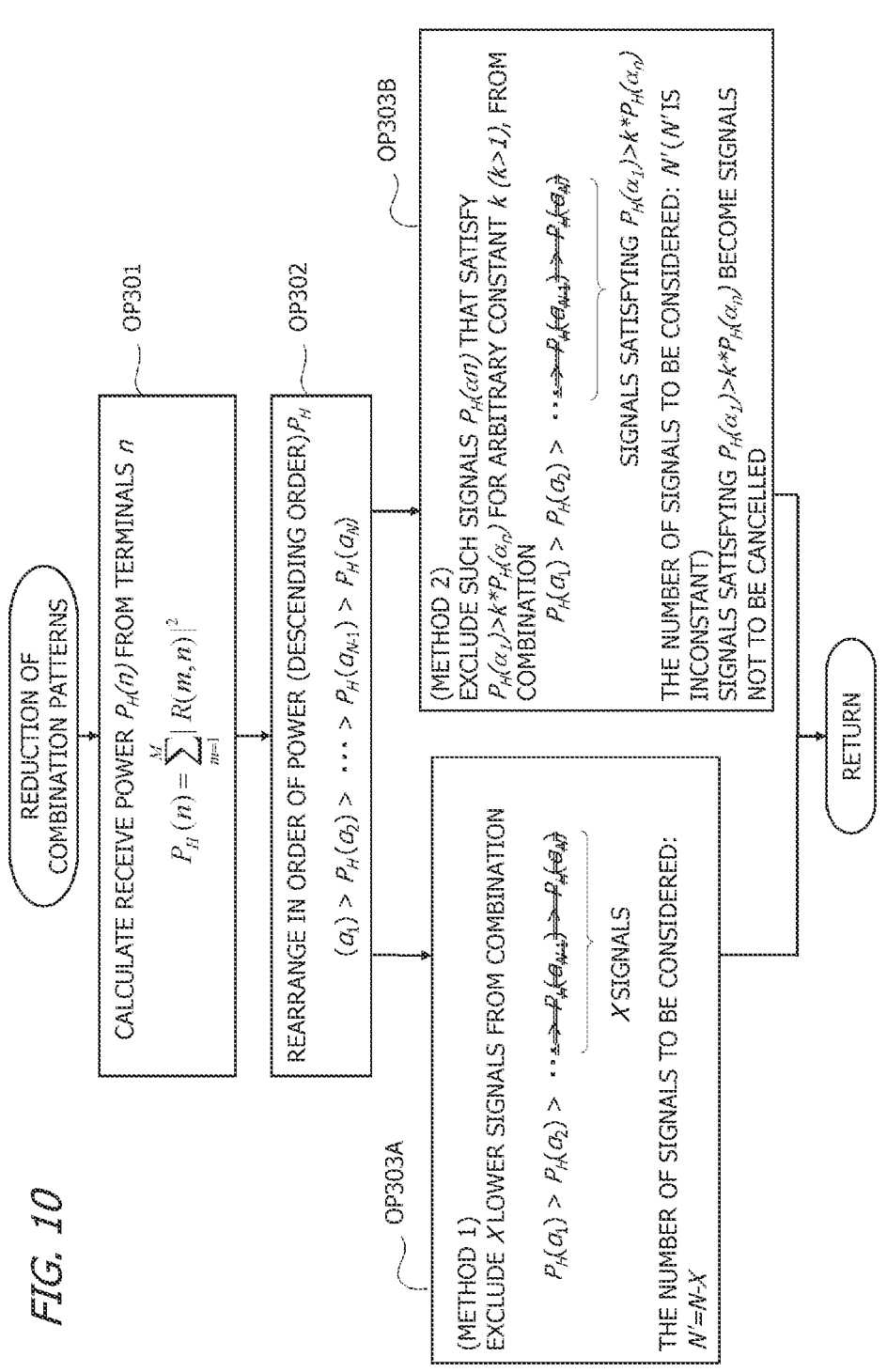
FIG. 10 illustrates an example of a flowchart of the combination pattern reduction process in the base station.

FIG. 10 illustrates an example of a flowchart of the combination pattern reduction process in the base station 1. The process illustrated in FIG. 10 corresponds to the process of OP203 of FIG. 7. The combination pattern reduction process illustrated in FIG. 10 is executed when the number of terminals from which signals have been simultaneously received is larger than the threshold M', that is, when the number of combination patterns is large.

At OP301, the processor 11 calculates receive powers P_H(n) from terminals n (n=1, 2, . . . , N). The receive powers P_H(n) from the terminals n are acquired by (Formula 2) below. Here, R(m, n) indicates a component on the m-th row and the n-th column.

$$P_H(n) = \sum_{m=1}^{M} |R(m, n)|^2 \qquad \text{(Formula 2)}$$

(Formula 2)

At OP302, the processor 11 rearranges the receive powers of the signals of the terminals 2 in descending order. In FIG. 10, $\alpha 1$ of P_H($\alpha 1$) indicates order after the rearrangement.

At OP303, the processor 11 identifies terminals to be excluded. As methods for identifying the signals to be excluded at OP303, there are methods 1 and 2. Which method is to be adopted to perform the process may be set, for example, by an administrator of the base station 1. OP303A is a process for identifying the signals to be excluded, by the method 1. OP303B is a process for identifying the signals to be excluded, by the method 2.

At OP303A, that is, in the method 1, the processor 11 identifies signals corresponding to lower X receive powers rearranged in descending order among signals of the terminals 2, as the signals to be excluded. In this case, the processor 11 sets the number N' of signals targeted by consideration of combination patterns to N–X.

At OP303B, that is, in the method 2, the receive powers P_H(αn) of the signals of the terminals 2 are multiplied by a constant k (k>1), and the processor 11 identifies such signals that values acquired by the multiplication are smaller than the largest receive power P_H(α1), as the signals to be excluded. In this case, the processor 11 sets the number N' of signals targeted by the consideration of combination patterns to a value acquired by subtracting the number of signals to be excluded, from N. Since the number of signals identified as the signals to be excluded is inconstant, the number N' of signals to be identified is also inconstant.

When the process of OP303A or OP303B ends, the process illustrated in FIG. 10 ends, and the process proceeds to OP204 of FIG. 7. Note that, since receive powers of the signals excluded at OP303A and OP303B are sufficiently smaller than the largest receive power P_H(α1), influence on an SIR value and the like is small enough to be ignored even if the signals are excluded from targets of consideration of a combination selection process, which is the next process.

FIG. 11 illustrates an example of a flowchart of the combination selection process in the base station 1. The process illustrated in FIG. 11 corresponds to the process of OP204 of FIG. 7. The process of FIG. 11 targets the N' signals determined at OP203 (FIG. 10) of FIG. 7.

At OP401, for the N' signals, the processor 11 creates all patterns of a combination of a desired signal (one signal), interference signals to be cancelled (M–1 signals) and interference signals not to be cancelled (N'–M signals). The number L of patterns for the one desired signal is the number of combinations of selecting M–1 signals from N'–1 signals.

A process from OP402 to OP405 is a process for acquiring an SIR for each combination and is executed for each of all the patterns (N'*L). At OP407, the processor $$P_i = \frac{1}{M} \sum_{p=1}^{M} \sum_{q=1}^{N'-M} |R_u(p, q)|^2 \qquad \text{(Formula 3)}$$

11 calculates interference power Pi of N'–M interference signals not to be cancelled, using (Formula 3) below. Here, Pi indicates interference power per receive antenna when interference powers of the N'–M interference signals not to be cancelled are allocated to the receive antennas.

At OP403, the processor 11 calculates an MMSE weight Wmmse according to (Formula 1). The MMSE weight Wmmse is an M×1 vector. At OP404, the processor 11 determines power Ps of the desired signal and power Pb of interference signals other than the desired signal. The power Pb of the interference signals is a total value of interference powers of the interference signals to be cancelled (M–1 signals) and the interference signals not to be cancelled (N'–M signals).

In order to determine the power Ps of the desired signal and the power Pb of the other interference signals, the processor 11 first multiplies a transpose vector (1×M) of the MMSE weight Wmmse by the whole channel matrix R (M×N') to acquire a vector G. The vector G is a 1×N' vector. A component of the first column of the vector G is a desired signal component Gs, and components of the second to N'-th columns of the vector G are interference signal components Gu(p) (p=2, . . . , N'). By squaring an absolute value of each component, power is acquired. In other words, the power Ps of the desired signal is acquired by squaring an absolute value of the desired signal component Gs. The power Pb of the interference signals is acquired by totaling squares of absolute values of the interference signal components Gu(p).

At OP405, the processor 11 calculates an SIR. The SIR is acquired by dividing the power Ps of the desired signal by the power Pb of the interference signals. The process from OP402 to OP405 is performed for each of all the patterns. When SIRs for all the patterns are acquired, the process proceeds to OP406.

At OP406, the processor 11 selects a combination with the largest SIR. After that, the process illustrated in FIG. 10 ends, and the process proceeds to OP205 of FIG. 7. Note that, if a negative judgment is made at OP202 in the process of FIG. 7, the process of OP203 is not performed, and, therefore, the process of OP204 (FIG. 11) is performed on the assumption of N'=N.

Figure 13:
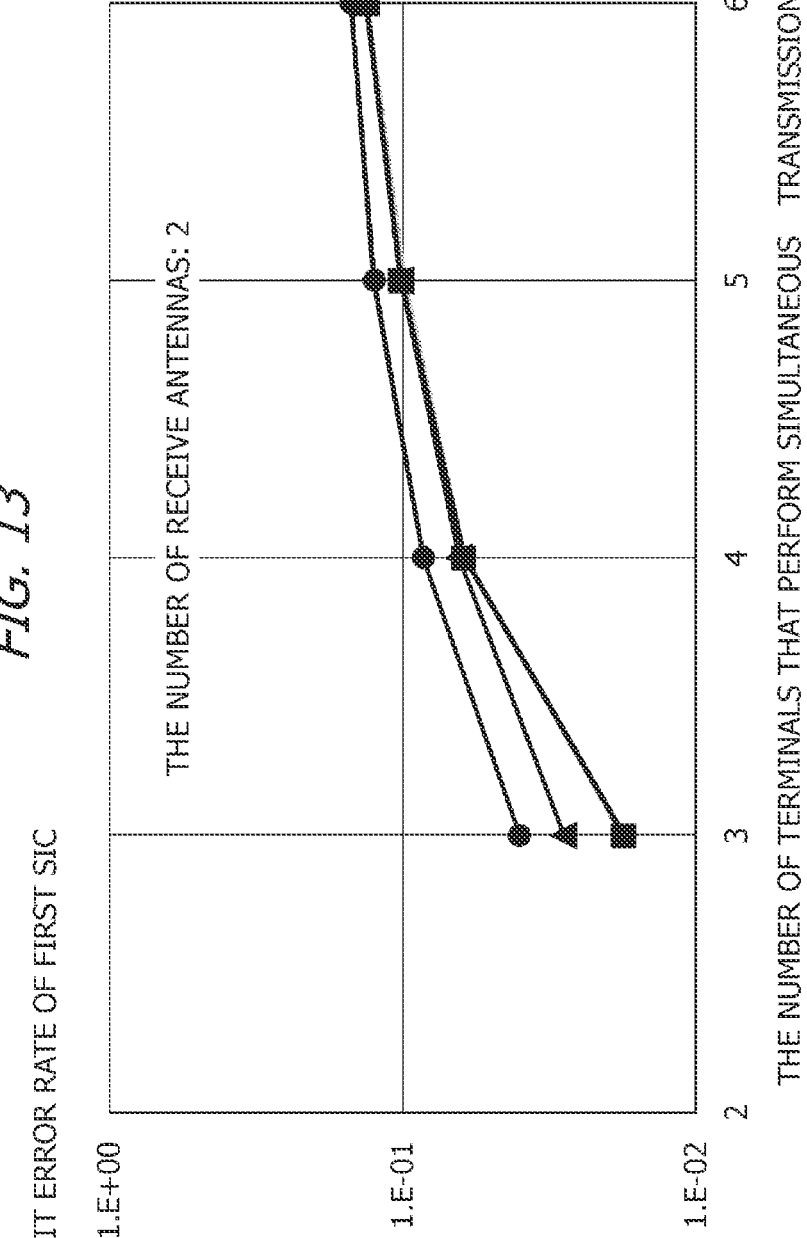
FIG. 13 illustrates results of simulations by the process of the present embodiment.
Figure 14:
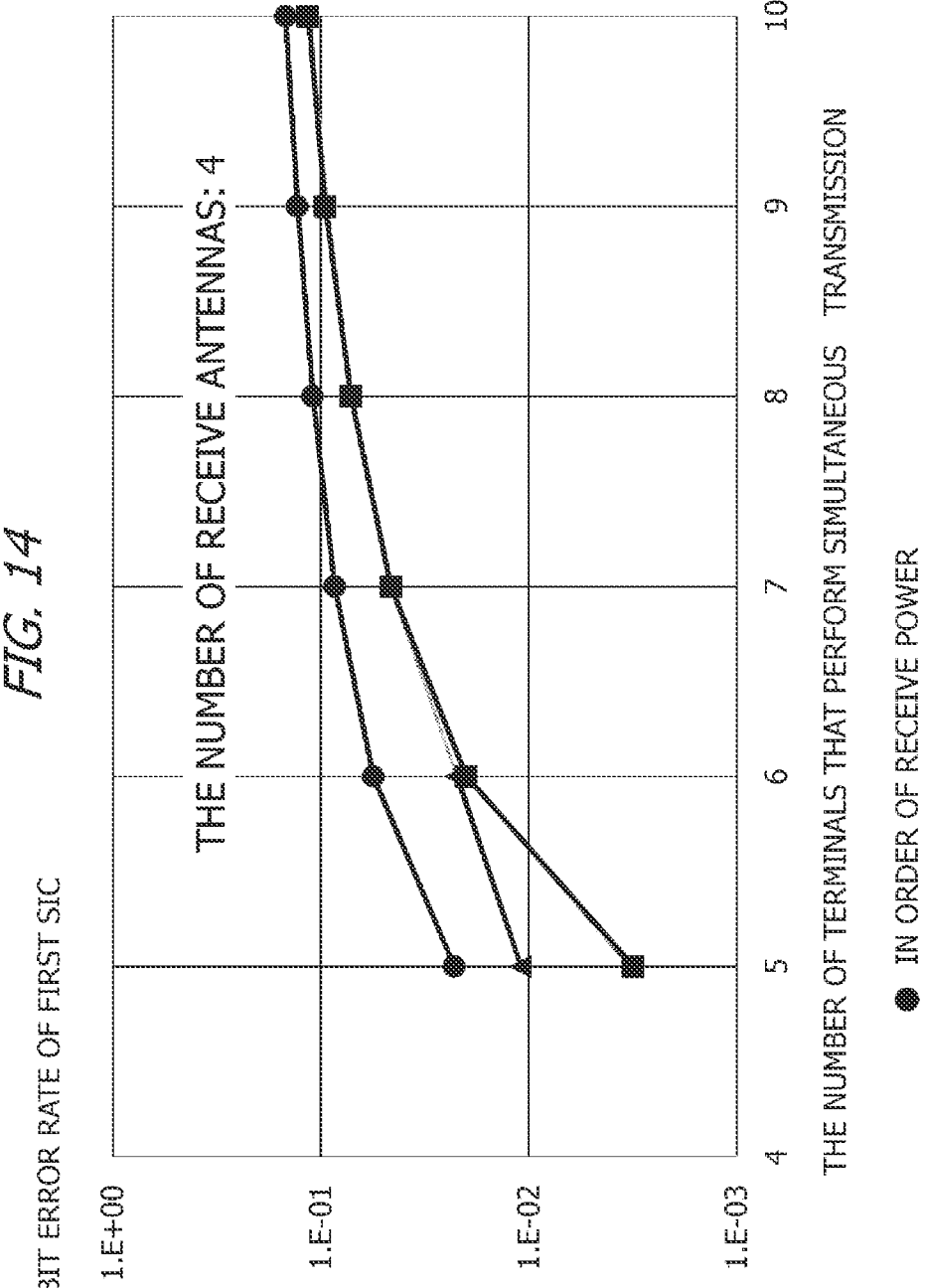
FIG. 14 illustrates results of simulations by the process of the present embodiment.

FIGS. 12 to 14 illustrate results of simulations by the process of the present embodiment. FIG. 12 illustrates conditions for the simulations. The simulations are performed for a case where the number of simultaneously transmitting terminals is from three to six (two transmit antennas for each of the terminals) and a case where the number of simultaneously transmitting terminals is from five to ten (four transmit antennas for each of the terminals).

The size of transmit data is 80 bits. An error correction code is a turbo code (a coding rate: ⅓). A modulation method is single carrier QPSK. As a transmission line, a one-pass Rayleigh fading channel with a maximum Doppler frequency of 0 Hz is assumed. Further, 30 dB is assumed as a signal-to-noise power ratio of the transmission line.

FIG. 13 illustrates a difference between bit error rates according to whether the combination pattern reduction process (FIG. 10) and the combination selection process (FIG. 11) are executed or not, in a case where the number of receive antennas is two, in the simulations. All of graphs in FIG. 13 illustrate examples without transmit diversity. In FIG. 13, the horizontal axis indicates the number of terminals that simultaneously perform transmission, and the vertical axis indicates a bit error rate.

In FIG. 13, a graph with circle marks (●) indicates a simulation result in a case where neither the combination pattern reduction process (FIG. 10) nor the combination selection process (FIG. 11) is executed. In the case of the graph with the circle marks, the desired signal, the interference signals to be cancelled and the interference signals not to be cancelled are determined in descending order of receive powers of signals. A graph with triangle marks (♦) indicates a simulation result in a case where the combination pattern reduction process (FIG. 10) and the combination selection process (FIG. 11) have been executed. In the case of the graph with the triangle marks (♦), the method 1 is adopted as the method for identifying a signal to be excluded, and one lower signal is excluded. A graph with black square marks indicates a simulation result in the case where the combination pattern reduction process (FIG. 10) and the combination selection process (FIG. 11) have been executed. In the case of the graph with the black square marks, the method 2 is adopted as the method for identifying a signal to be excluded, and the constant k=4 is set.

When the graphs of simulation results illustrated in FIG. 13 are compared, it is indicated that, in any of the cases where the number of simultaneously transmitting terminals is three to six, the bit error rate is lower in the case where the combination pattern reduction process (FIG. 10) and the combination selection process (FIG. 11) are executed (the graph with the triangle marks and the graph with the square marks) than in the case where the processes are not executed (the graph with the circle marks).

FIG. 14 illustrate a difference between bit error rates according to whether the combination pattern reduction process (FIG. 10) and the combination selection process (FIG. 11) are executed or not, in a case where the number of receive antennas is four, in the simulations. In FIG. 14, settings for the simulations and graphs are similar to those of FIG. 13.

When the graphs of simulation results illustrated in FIG. 14 are compared, it is indicated that, in any of the cases where the number of simultaneously transmitting terminals is five to ten, the bit error rate is lower in the case where the combination pattern reduction process (FIG. 10) and the combination selection process (FIG. 11) are executed (a graph with triangle marks and a graph with square marks) than in the case where the processes are not executed (a graph with circle marks).

From the simulation results illustrated in FIGS. 13 and 14, it is possible to reduce an error rate by determining an SIR for each of all combination patterns for classifying signals from N terminals 2 into a desired signal, interference signals to be cancelled and interference signals not to be cancelled, in overloaded MIMO, and separating the desired signal using a combination with the largest SIR.

Operation and Effects of First Embodiment

According to the first embodiment, it is possible to determine such a combination of a desired signal, interference signals to be cancelled and interference signals not to be cancelled that the SIR is the highest, in an overloaded MIMO situation in which the number of terminals that simultaneously perform transmission is larger than the number of receive antennas. Thereby, it is possible to reduce an error rate of a desired signal and reduce deterioration of communication quality even under the overloaded MIMO situation.

Further, the SIR for each pattern used at the time of determining the combination of a desired signal, interference signals to be cancelled and interference signals not to be cancelled is determined based on a calculation result of multiplying a channel matrix of received signals by an MMSE weight. Thereby, it is possible to determine the combination based on an actually acquired output, and it is possible to reduce the error rate more.

Further, in the first embodiment, since signals the receive power of which is sufficiently small are excluded from targets of determination of a combination of a desired signal, interference signals to be cancelled and interference signals not to be cancelled, it is possible to reduce the number of patterns of the combination, and reduce a load of the processing for calculating the SIR for each pattern.

According to the communication system of the present embodiment, it is possible to, by separating signals from the individual terminals 2 by SIC in overloaded MIMO, control a packet error rate and enable efficient radio communication. Further, according to the communication system of the present embodiment, it is possible to further control the packet error rate by using transmit diversity together with SIC in overloaded MIMO.

Therefore, when CG is implemented in IoT, and many terminals 2, the number of which exceeds the number of receive antennas of the base station 1, communicate with the base station 1, a packet error rate is controlled, and efficient and reliable radio communication is enabled by the base station 1 performing SIC. Further, by the base station 1 using transmit diversity together with SIC, more efficient and reliable radio communication is enabled. In other words, in the present embodiment, by the base station 1 performing the SIC process when assigning CG resources to the terminals 2 and permitting CG, improvement of reliability of communication by CG and efficiency of communication due to control of the packet error rate are expected.

Further, in the present embodiment, since interference replicas are generated based on error-corrected data, the base station 1 can accurately generate and feed back the interference replicas even if the signal-to-interference noise ratio SINR is low due to an overloaded MIMO state.

Other Embodiments

The embodiment described above is an example, and the present disclosure may be changed and carried out as appropriate without departing from the gist of the present disclosure.

Though the description is made on the assumption that the terminals 2 and the base station 1 are a transmission side and a reception side, respectively, in the first embodiment, the base station and the terminals 2 may be a transmission side and a reception side, respectively. If the base station 1 and the terminals 2 are the transmission side and the reception side, respectively, each terminal 2 has a configuration similar to the configuration of the base station 1 described in the first embodiment and performs a similar process. Therefore, the base station 1 is an example of "a reception-side apparatus" as well as an example of "a transmission-side apparatus". The terminals 2 are an example of "transmission-side apparatuses" as well as an example of "reception-side apparatuses".

The processes and means described in the present disclosure may be freely combined to the extent that no technical conflict exists.

A process which is described to be performed by one device may be performed divided among a plurality of devices. Processes described to be performed by different devices may be performed by one device. Each function is to be implemented by which hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. A method executed by a reception-side apparatus provided with M receive antennas, comprising:
   when the M receive antennas receive signals simultaneously from N transmission-side apparatuses which are more than the M receive antennas, wherein all of the signals are sent to the reception-side apparatus,
   determining a weight of minimum mean square error (MMSE) using power of signals from N–M transmission-side apparatuses among the N transmission-side apparatuses as a part of interference power; and acquiring a signal from the signals received from the N transmission-side apparatuses using the weight of MMSE and information indicating propagation characteristics between the M receive antennas using the N transmission-side apparatuses, the acquired signal being from one of the N transmission-side apparatuses other than N−M transmission-side apparatuses.

2. The method according to claim 1, wherein the reception-side apparatus determines the weight of MMSE by a following formula 1, where a matrix R is a matrix acquired by multiplying a channel matrix H between the N transmission-side apparatuses and the reception-side apparatus by a transmission amplitude of each of the N transmission-side apparatuses;

Pn indicates noise power per receive antenna;

Pi indicates power of interference signals not to be cancelled;

a matrix I is a unit matrix; and a vector r is a channel vector multiplied by a transmission amplitude of the first signal;

$$Wmmse = \left\{ R^* R^T + (P_n + P_i)I \right\}^{-1} r_1^* \qquad \text{(Formula 1)}$$

3. The method according to claim 1, wherein the reception-side apparatus acquires the power of the signals from the N−M transmission-side apparatuses from channel estimates.

4. The method according to claim 1, wherein the reception-side apparatus determines N−M transmission-side apparatuses corresponding to N−M signals having lowest receive power among the signals from the N transmission-side apparatuses as the N−M transmission-side apparatuses.

5. A reception-side apparatus comprising:

M receive antennas; and a processor configured to, when the M receive antennas receive signals simultaneously from N transmission-side apparatuses which are more than the M receive antennas, wherein all of the signals are sent to the reception-side apparatus, determine a weight of minimum mean square (MMSE) using power of signals from N−M transmission-side apparatuses among the N transmission-side apparatuses as a part of interference power; and acquire a signal from the signals received from the N transmission-side apparatuses using the weight of MMSE and information indicating propagation characteristics between the M receive antennas and the N transmission-side apparatuses, the acquired signal being from one of the N transmission-side apparatuses other than the N−M transmission-side apparatuses.

6. The reception-side apparatus according to claim 5, wherein the processor determines the weight of MMSE by a following formula 1, where a matrix R is a matrix acquired by multiplying a channel matrix H between the N transmission-side apparatuses and the reception-side apparatus by a transmission amplitude of each of the N transmission-side apparatuses;

Pn indicates noise power per receive antenna;

Pi indicates power of interference signals not to be cancelled;

a matrix I is a unit matrix; and a vector r is a channel vector multiplied by a transmission amplitude of the first signal, $$Wmmse = \left\{ R^* R^T + (P_n + P_i)I \right\}^{-1} r_1^* \qquad \text{(Formula 1)}$$

7. The reception-side apparatus according to claim 5, wherein the processor is configured to acquire the power of the signals from the N−M transmission-side apparatuses from channel estimates.

8. The reception-side apparatus according to claim 5, wherein the processor determines N−M transmission-side apparatuses corresponding to N−M signals having lowest receive power among the signals from the N transmission-side apparatuses as the N−M transmission-side apparatuses.

* * * * *